US012645463B2

(12) United States Patent
Biswas et al.

(10) Patent No.: US 12,645,463 B2
(45) Date of Patent: Jun. 2, 2026

(54) DEVICE, METHOD AND SYSTEM FOR PROVIDING BRANCH INFORMATION TO AN INSTRUCTION FETCH UNIT BASED ON A DETECTION OF A FALL-THROUGH EVENT WHEREIN MULTIPLE FETCHED INSTRUCTIONS COMPRISE A BRANCH INSTRUCTION

(71) Applicant: Intel Corporation, Santa Clara, CA (US)

(72) Inventors: Baishik Biswas, Bangalore (IN); Anant Vithal Nori, Bangalore (IN); Sreenivas Subramoney, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/898,378

(22) Filed: Sep. 26, 2024

(65) Prior Publication Data

US 2026/0086815 A1      Mar. 26, 2026

(51) Int. Cl.
*G06F 9/38*           (2018.01)
(52) U.S. Cl.
CPC .......... *G06F 9/3861* (2013.01); *G06F 9/3806* (2013.01); *G06F 9/3844* (2013.01)
(58) Field of Classification Search
CPC ..... G06F 9/3861; G06F 9/3844; G06F 9/3806
See application file for complete search history.

(56) References Cited

U.S. PATENT DOCUMENTS

| | | | |
|---|---|---|---|
| 6,496,923 B1 | 12/2002 | Gruner et al. | |
| 9,753,732 B2 | 9/2017 | Jiang et al. | |
| 10,592,244 B2 | 3/2020 | Chynoweth et al. | |
| 11,645,078 B2 | 5/2023 | Chauhan et al. | |
| 11,928,472 B2 | 3/2024 | Pokam et al. | |
| 2004/0158697 A1* | 8/2004 | Col ..................... G06F 9/30094 | |
| | | | 712/E9.06 |
| 2009/0089564 A1* | 4/2009 | Brickell ................ G06F 9/3844 | |
| | | | 712/E9.045 |
| 2012/0079255 A1 | 3/2012 | Combs et al. | |
| 2017/0147346 A1* | 5/2017 | Hornung ............... G06F 9/3806 | |
| 2020/0133679 A1 | 4/2020 | Brandt et al. | |

(Continued)

OTHER PUBLICATIONS

Saurabh Gupta, et al. Opportunistic Early Pipeline Re-steering for Data dependent Branches. In Proceedings of the 2020 International Conference on Parallel Architectures and Compilation Techniques (PACT '20), 12 pages (Year: 2020).*

*Primary Examiner* — Keith E Vicary

(74) *Attorney, Agent, or Firm* — Essential Patents Group, LLP

(57)           ABSTRACT

Techniques and architectures for determining a target of a branch instruction. In an embodiment, a processor core detects a fall through event wherein multiple fetched instructions comprise one or more branch instructions. Based on the fall through event, a repository is provided with respective branch information for each of the one or more branch instructions. The repository functions as a cache that is available to an evaluation circuit at an instruction fetch stage of the processor core. Branch information at the repository is accessible to facilitate a relatively early identification of an instruction as being of a branch instruction type. In another embodiment, the early identification enables re-steering of a speculative execution sequence.

20 Claims, 12 Drawing Sheets

(56)                  References Cited

U.S. PATENT DOCUMENTS

| | | |
|---|---|---|
| 2022/0100516 A1 | 3/2022 | Madaelil et al. |
| 2023/0195464 A1 | 6/2023 | Nori et al. |
| 2025/0217155 A1* | 7/2025 | Deshmukh ............ G06F 9/3842 |
| 2025/0298622 A1* | 9/2025 | Biswas ................. G06F 9/3806 |

* cited by examiner

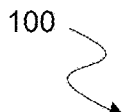
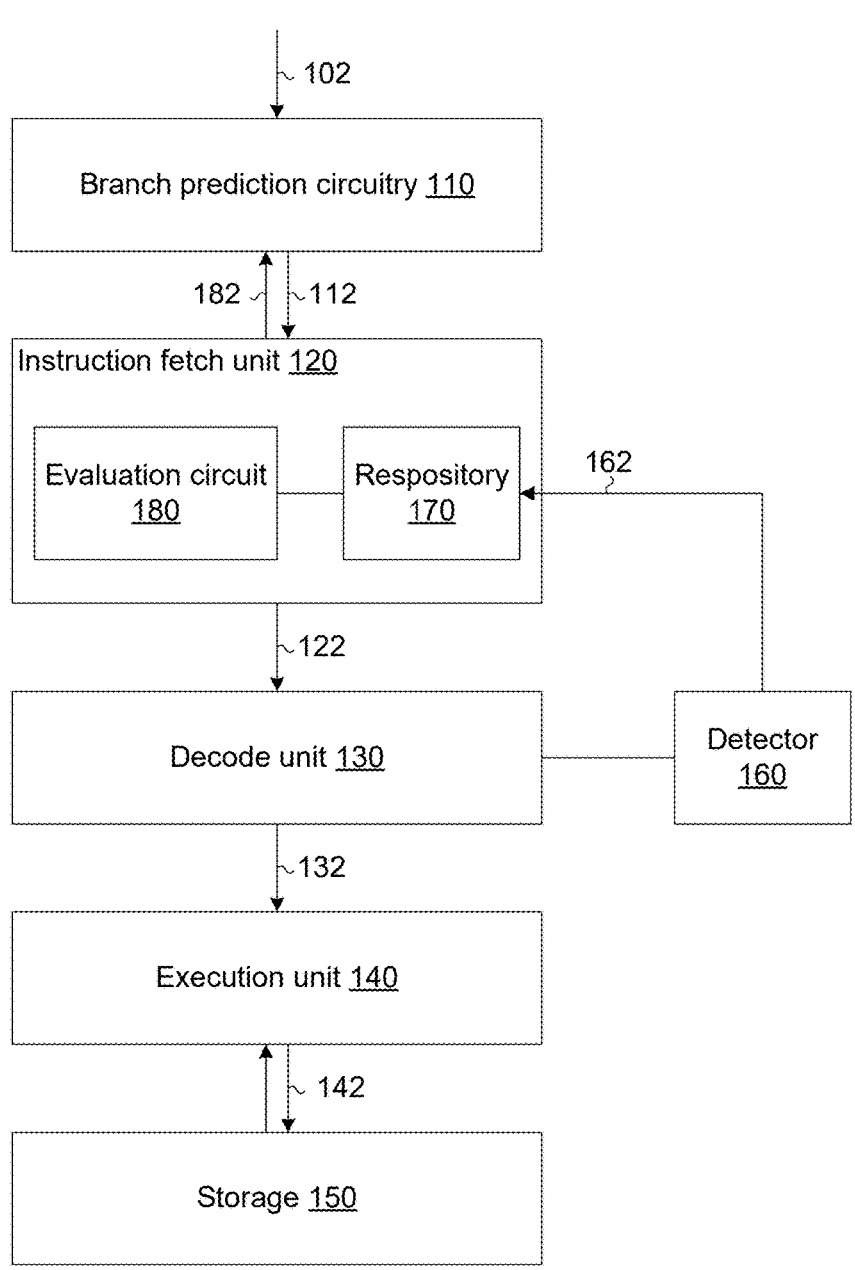
FIG. 1

200

BAClear 202

201

300

310

Monitor operations of a decoder unit to detect an event wherein multiple instructions are fetched, wherein the multiple instructions comprise a branch instruction

312

Based on the event, provide branch information to a repository, wherein the branch information corresponds to the branch instruction

302

314

Receive an indication that the branch instruction is to be fetched, wherein the indication is based on an output of a branch prediction unit

316

Based on the indication, perform a search of the repository to access the branch information

318

Based on the search, send to the branch prediction unit a signal to clear a prediction of an instruction to be executed after the branch instruction

FIG. 3

600
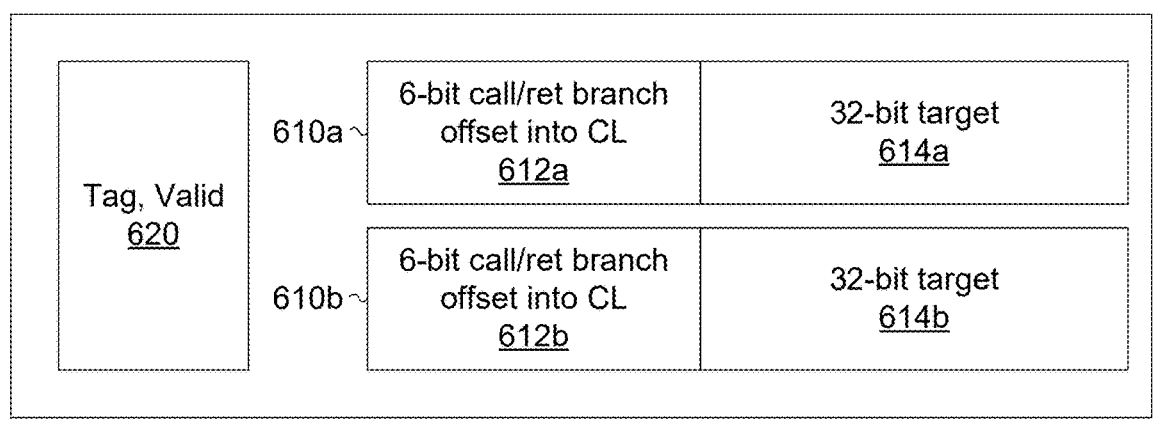
FIG. 6

PROCESSOR 900

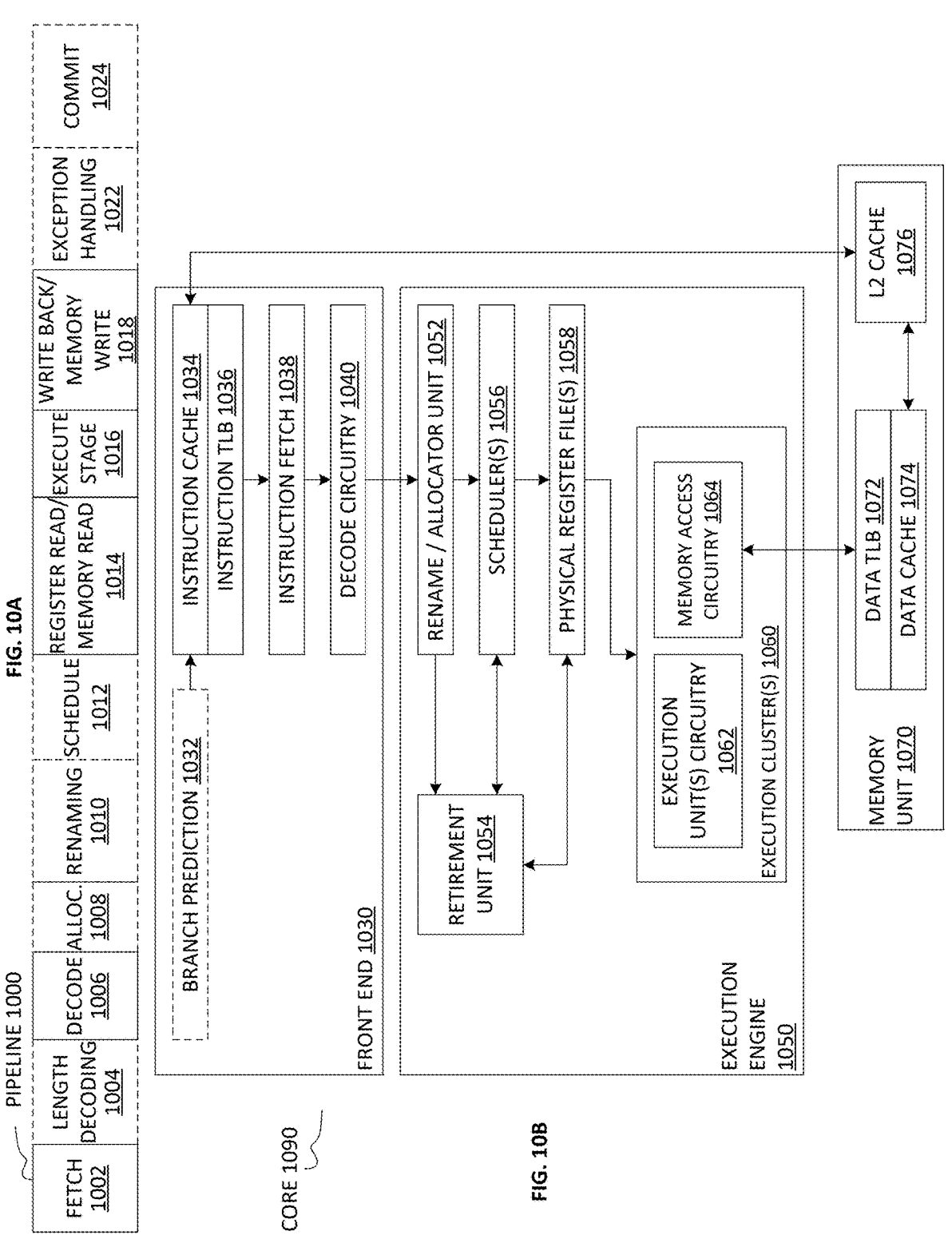

FIG. 10A

PIPELINE 1000

| FETCH 1002 | LENGTH DECODING 1004 | DECODE 1006 | ALLOC. 1008 | RENAMING 1010 | SCHEDULE 1012 | REGISTER READ/ MEMORY READ 1014 | EXECUTE STAGE 1016 | WRITE BACK/ MEMORY WRITE 1018 | EXCEPTION HANDLING 1022 | COMMIT 1024 |

FIG. 10B

CORE 1090

FRONT END 1030

BRANCH PREDICTION 1032

INSTRUCTION CACHE 1034
INSTRUCTION TLB 1036

INSTRUCTION FETCH 1038

DECODE CIRCUITRY 1040

EXECUTION ENGINE 1050

RENAME / ALLOCATOR UNIT 1052

RETIREMENT UNIT 1054

SCHEDULER(S) 1056

PHYSICAL REGISTER FILE(S) 1058

EXECUTION CLUSTER(S) 1060

EXECUTION UNIT(S) CIRCUITRY 1062

MEMORY ACCESS CIRCUITRY 1064

MEMORY UNIT 1070

DATA TLB 1072
DATA CACHE 1074

L2 CACHE 1076

Register architecture 1200

Segment registers 1220

Machine specific registers 1235

Writemask/predicate registers 1215

Instruction pointer register(s) 1230

Scalar FP register file 1245

Control register(s) 1255

Vector/SIMD registers 1210

Debug registers 1250

General purpose registers 1225

Mem. management registers 1265

Flag register(s) 1240

Machine check registers 1260

DEVICE, METHOD AND SYSTEM FOR PROVIDING BRANCH INFORMATION TO AN INSTRUCTION FETCH UNIT BASED ON A DETECTION OF A FALL-THROUGH EVENT WHEREIN MULTIPLE FETCHED INSTRUCTIONS COMPRISE A BRANCH INSTRUCTION

BACKGROUND

1. Technical Field

This disclosure generally relates to processor operations and more particularly, but not exclusively, to circuitry which facilitates speculative instruction fetches.

2. Background Art

To improve performance, some processors utilize speculative processing—sometimes also referred to as Out-Of-Order (OOO) processors—which attempts to predict the future course of an executing program to speed its execution, for example, by employing parallelism. The predictions may or may not end up being correct. When they are correct, a program may execute in less time than when non-speculative processing is employed. When a prediction is incorrect, however, the processor has to re-steer branch operations and recover its state to a point prior to the misprediction, which creates inefficiencies.

Moreover, despite recent advances in microprocessors design, achieving high single-thread performance, even in the multicore era, remains a major challenge. For emerging datacenter and cloud applications, a significant number of processor cycles (about 30%) are lost in the front-end engine of a processor, where a large fraction of it (about 35%) may be caused by branch re-steers.

BRIEF DESCRIPTION OF THE DRAWINGS

The various embodiments of the present invention are illustrated by way of example, and not by way of limitation, in the figures of the accompanying drawings and in which:

FIG. 1 is a functional block diagram showing features of a processor core which facilitates branch prediction according to an embodiment.

FIG. 3 is a flow diagram showing features of a method to determine a branch prediction according to an embodiment.

FIG. 6 is a format diagram illustrating features of a way in a cache which provides branch information according to an embodiment.

FIG. 10A is a block diagram illustrating both an exemplary in-order pipeline and an exemplary register renaming, out-of-order issue/execution pipeline according to examples.

FIG. 10B is a block diagram illustrating both an exemplary example of an in-order architecture core and an exemplary register renaming, out-of-order issue/execution architecture core to be included in a processor according to examples.

DETAILED DESCRIPTION

Figure 2A:
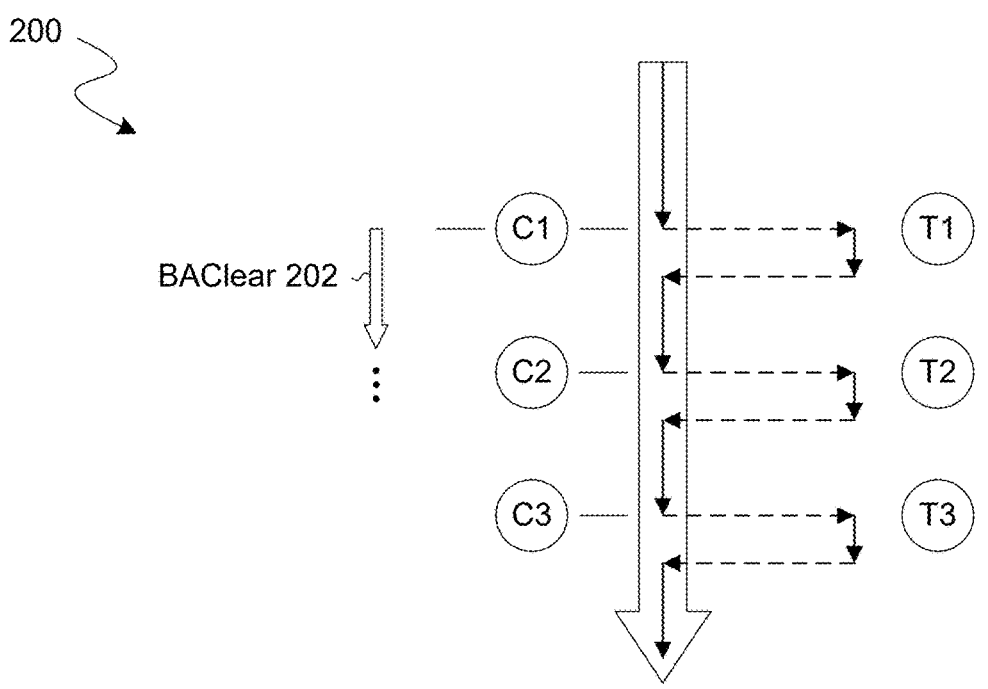
FIG. 2A is a data diagram showing features of code segments accessed by a speculative run-ahead from a branch predictor according to an embodiment.

Embodiments discussed herein variously provide techniques and mechanisms for processor circuitry to be steered from a speculative execution path based on previously fetched instructions. The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including a processor that provides branch prediction functionality.

The description herein includes numerous details to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/–10% of a target value. For example, unless otherwise specified in the explicit context of their use, the terms "substantially equal," "about equal" and "approximately equal" mean that there is no more than incidental variation between among things so described. In the art, such variation is typically no more than +/–10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

FIG. 1 shows a processor core 100 which facilitates branch prediction according to an embodiment. Processor core 100 illustrates features of one example embodiment wherein a cached version of instruction branch information is made available, based on the decoding of previously-fetched operations, to facilitate correction of a branch misprediction.

In some embodiments, processor core 100 is implemented for, or in, a general-purpose processor (e.g., a central processing unit (CPU) or other general-purpose microprocessor of the type used in servers, desktop, laptop, smart phones, or other computers). Alternatively, processor core 100 is implemented for, or in, any of various suitable special-purpose processors. Examples of suitable special-purpose processors include, but are not limited to, network processors, communications processors, graphics processors, co-processors, digital signal processors (DSPs), embedded processors, and controllers (e.g., microcontrollers). In some embodiments, processor core 100 is disposed on a semiconductor die or integrated circuit and includes hardware (e.g., transistors, circuitry, etc.).

As shown in FIG. 1, processor core 100 comprises branch prediction circuitry 110, an instruction fetch unit 120, a decode unit 130, an execution unit 140, and storage 150. Branch prediction circuitry 110 (e.g., including some or all of a branch prediction unit, a branch target buffer and/or the like) is coupled to receive, snoop or otherwise detect a stream 102 of instructions which are to be executed with the processor core 100. For example, branch prediction circuitry 110 receives an indication of a currently executing instruction of stream 102, a next scheduled instruction of stream 102, or the like. Based on stream 102, branch prediction circuitry 110 performs operations to identify instructions which are to be speculatively fetched for decoding, and possible execution. For example, branch prediction circuitry 110 predicts that one or more instructions are to be executed based on an instruction indicated in stream 102—e.g., wherein branch prediction circuitry 110 predicts a target of a branch instruction. Based on such predicting, branch prediction circuitry 110 provides indicia 112 of one or more instructions to be speculatively fetched for decoding and (at least potential) execution. The indicia 112 are communicated to instruction fetch unit 120, directly or indirectly, by branch prediction circuitry 110.

Based on indicia 112, the instruction fetch unit (or simply "fetch unit") 120 fetches instructions 122 which are provided, directly or indirectly, to decode unit 130. The instructions 122 represent macroinstructions, instructions of an instruction set of the processor, instructions that the decode unit 130 is able to decode, or the like. In an embodiment, fetch unit 120 is coupled to fetch instructions from on-die storage (not shown) of the processor, such as, for example, one or more caches, buffers, queues, or the like, and/or from system memory. The decode unit 130 is coupled to receive the fetched instructions 122 (e.g., the same instructions but reordered), directly or indirectly, from fetch unit 120, and is operable to decode the fetched instructions 122 into one or more relatively low-level instructions or control signals 132 (e.g., one or more microinstructions, micro-operations, micro-code entry points, decoded instructions, or control signals, etc.).

The execution unit 140 is coupled with the decode unit 130 to receive the one or more lower-level instructions or control signals 132 and is operable to generate corresponding results 142. Although some embodiments are not limited in this regard, the results 142 are stored in on-die storage 150—e.g., registers, caches, etc.—of the processor which includes core 100 (or, alternatively, are stored in memory). In various embodiments, processor core 100 instead omits, but facilitates coupling to, storage 150—e.g., wherein storage 150 comprises one or more external processor registers, a shared cache, a system memory, or the like.

Various conventional out-of-order (OOO) processors use a branch prediction unit (BPU) to speculatively predict the outcome of branch instructions and fetch instructions down a speculative path. However, on a misprediction—which, in conventional architectures, is determined at a decoder stage—a BAClear signal, a JEClear signal, or similar signal is asserted to clear speculatively fetched code. Thus, BPU misprediction in traditional processor architectures not only tends to pollute an instruction cache with speculative code, but also stalls the instruction fetch pipeline—e.g., where a BAClear signal is communicated only after a misprediction is identified at or after an instruction decode stage. Since modern processor cores are very sensitive to fetch stalls, the lateness of a misprediction response signal (e.g., a BAClear, or a JEClear) being asserted has a significant impact on processor performance.

Some embodiments variously mitigate the instances and/ or impact of mispredictions by saving branch information which, in conventional processor microarchitectures, would otherwise be cleared—e.g., with a BAClear, a JEClear, or the like—in response to the detection of a misprediction. This branch information is made available at a relatively early stage of the processor front-end (in a fetch stage, for example) to enable early detection of misprediction and/or early branch re-steering.

By way of illustration and not limitation, in the example embodiment shown, processor core 100 further comprises a detector 160 which is coupled to decode unit 130. Detector 160 comprises circuitry to monitor operations of the decode unit 130 to detect for the presence or absence of an event (referred to herein as a "fall through event") wherein multiple instructions are fetched with instruction fetch unit 120, wherein at least one such fetched instruction is of a branch instruction type. In some embodiments, instruction decoding by decode unit 130 determines an instruction type of a given instruction—e.g., including decode unit 130 identifying an opcode of said given instruction. In an embodiment, decode unit 130 identifies a given instruction as belonging to a particular one of multiple instruction types that (for example) include a direct call instruction type and a return instruction type.

In some embodiments, instruction fetch unit 120 comprises (or in another embodiment, is coupled to) a repository 170 that, based on the detected fall through event, is to receive branch information 162 from the detector 160. Some or all of branch information 162 corresponds to (e.g., is descriptive of) a first branch instruction of the multiple instructions which were variously fetched in the fall through event detected by detector 160.

In an example embodiment, branch information 162 identifies the first branch instruction as being of a particular branch instruction type (e.g., one of a direct call type or a return type). In some embodiments, branch information 162 further comprises an identifier of another instruction as being a target of the first branch instruction. By way of illustration and not limitation, branch information 162 comprises a decoded version of the first branch instruction (for example).

By way of illustration and not limitation, based on the detected fall through event, the detector 160 provides to repository 170 respective branch information for each direct call instruction of the multiple instructions. In some embodiments, each direct call instruction of the multiple instructions corresponds to a different respective return instruction of one or more return instructions. In one such embodiment, the detector 160, based on the detected fall through event, provides to repository 170 respective branch information for each of the one or more return instructions.

In some embodiments, detector 160 (or another suitable agent) further provides to repository 170 index information and/or metadata which corresponds to some or all of the multiple instructions—e.g., wherein such index information and/or metadata facilitates a searching of repository 170 to identify a particular branch instruction (and/or a target thereof).

In an illustrative scenario according to one embodiment, the instruction fetch unit 120 is to fetch instructions from a first cache (e.g., an instruction cache, not shown), wherein repository 170 comprises a second cache. For example, detector 160 (or other suitable circuitry) caches the branch information 162 to a line of the second cache based on the detected fall through event. In one such embodiment, the line of the second cache is indexed based on a corresponding other line of the first cache—e.g., wherein the other line caches a non-decoded (or other) version of the first branch instruction.

In some embodiments, for each branch instruction of the multiple instructions which is of a direct call instruction type or of a return instruction type, the detector 160 caches branch information, which corresponds to that branch instruction, to a different respective line of the second cache based on the detected fall through event. Alternatively or in addition, based on the detected fall through event, detector 160 (or other suitable circuitry) tags a given such line of the second cache with metadata which identifies the corresponding branch instruction as being one of the multiple instructions.

In some embodiments, such metadata further indicates a relative location of the corresponding branch instruction in a sequence of the multiple instructions. In one such embodiment, the metadata further indicates a location of the first branch instruction relative to a most recently executed branch instruction in a sequence of the multiple instructions. Such metadata facilitates a determination, in some embodiments, as to which branch instruction—if any—of the multiple instructions is a next branch instruction after a most recently executed branch instruction of the multiple instructions (and, accordingly, after a corresponding most recently executed target instruction).

For example, instruction fetch unit 120 further comprises (or is coupled to operate with) an evaluation circuit 180 which is coupled to the repository 170. Evaluation unit 180 comprises circuitry which is operable to directly or indirectly receive an indication that the first branch instruction is to be fetched. The indication includes, or is otherwise based on, an output of the branch prediction circuitry 110 (such as the illustrative indicia 112 shown). Based on the indication, evaluation unit 180 performs a search of the repository 170 to access the branch information 162 previously provided by detector 160. Based on the search of repository 170 (for example, where the search results in a hit of a cache line which includes the corresponding branch information), evaluation unit 180 determines that the first branch instruction is of a branch instruction type—e.g., without the first branch instruction needing to be fetched and decoded for such a determination to take place. Based on the access of the branch information in repository 170, evaluation unit 180 sends to the branch prediction circuitry 110 a signal 182 to clear a prediction of an instruction to be executed after the branch instruction.

In an embodiment, signal 182 clears one or more entries from a branch target buffer (not shown) which branch prediction circuitry 110 includes or, alternatively, is coupled to. In some embodiments, based on the search of repository 170, evaluation circuit 180 sends signal 182—or another suitable signal—to additionally or alternatively clear one or more entries of a prediction queue (not shown) which is coupled between the branch prediction circuitry 110 and the evaluation circuit 180. In some embodiments, based on the search of repository 170, evaluation circuit 180 additionally or alternatively generates one or more other signals—e.g., to provide the target of the first branch instruction to other circuitry of instruction fetch unit 120, or to indicate to such other circuitry a location, in an instruction cache (for example), from which the target instruction can be fetched.

To achieve a high ILP, certain processors (e.g., central processing units (CPUs)) rely on the front-end branch predictor (e.g., a branch prediction unit (BPU)) to run ahead of instruction fetch and keep an OOO instruction window fed. In certain examples, the branch predictor however, speculates that a given instruction is of an non-branch (or "in-line") instruction type, or speculates the outcome (e.g., taken or not taken) of a branch instructions in its deep run ahead. Such speculation often results in numerous instructions being fetched (e.g., speculative code) as a group, where some or all such instructions are subject to being discarded eventually. Further, in certain examples where the branch predictor has first begun (e.g., the branch predictor is "cold"), the branch run ahead is mostly fall through and does not redirect to different sections of code. Thus, even though the speculative code does not get executed at the time of fetch (e.g., was a "misprediction"), that speculative code often is executed later.

FIG. 2A illustrates a code segment 200 with speculative run-ahead from a branch predictor according to some examples. In certain examples, code segment 200 has three functions calls: C1, C2, and C3, e.g., where C1, C2, and C3 are call (e.g., jump) instructions within the same cache-line width of instruction data that was fetched. In certain examples, the branch predictor (e.g., the branch target buffer (BTB) thereof) is cold, and falls through during an instruction fetch, which results in calls C2 and C3 being brought into the front-end. In various conventional processor core architectures, when the processor (e.g., CPU) discovers call C1, C2 and C3 are seen as speculative, they are discarded by a branch predictor clear (e.g., branch address clear (BA-Clear) 202). In a typical scenario, when program control subsequently returns from the C1 call's body (e.g., target T1)—for example, after a later decoding and execution of call C1—call C2 gets executed and subsequently C2's target T2 is fetched. However, in such a case, both call targets T1 and T2 miss in the instruction cache because of the earlier BA Clear 202. By contrast, before getting discarded, some embodiments cache or otherwise save useful branch information from the speculated code.

Figure 2B:
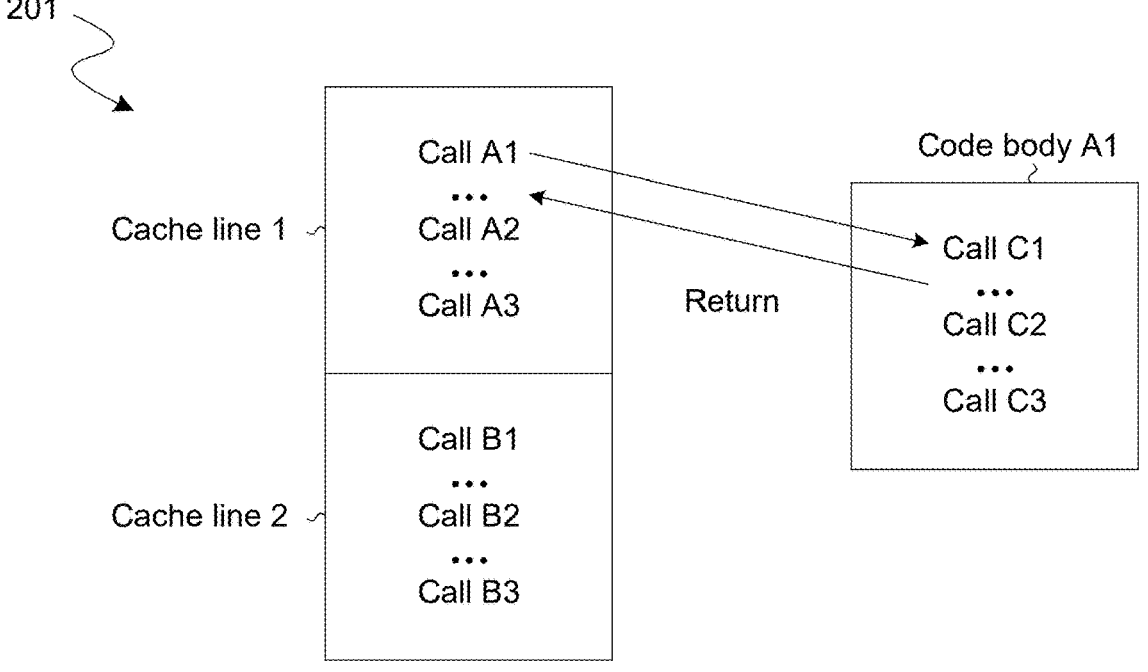
FIG. 2B is a data diagram showing features of a code segment with multiple direct calls in consecutive cache lines of fetched instruction data according to an embodiment.

FIG. 2B illustrates a code segment 201 with multiple direct calls (e.g., direct call instructions) in consecutive cache lines (e.g., 64-byte wide) of fetched instruction data (e.g., cache line 1 and cache line 2) according to some embodiments. Code segment 201 includes call A1, call A2, and call A3 instructions in cache line 1 (e.g., 64 bytes wide), and call B1, call B2, and call B3 instructions in cache line 2 (e.g., 64 bytes wide). Call A1 instruction is to call (e.g., transfer execution to) the code body A1 (including call C1, call C2, and call C3 instructions, e.g., packed into a single cache line), e.g., with no jump instructions between the calls.

FIG. 3 shows a method 300 for determining a branch prediction according to an embodiment. The method 300 illustrates one example of an embodiment wherein branch information is made available to an instruction fetch stage of a processor core based on an earlier decode of speculatively fetched instructions. Operations such as those of method 300 are performed with any of various combinations of suitable hardware (e.g., circuitry), firmware and/or executing software which, for example, provide some or all of the functionality of processor core 100.

As shown in FIG. 3, method 300 comprises (at 310) monitoring operations of a decoder unit to detect a "fall through" event wherein multiple instructions are fetched, wherein the multiple instructions comprise a branch instruction. For example, detecting the event includes a detector circuit—such as detector 160—determining that, for at least one (and in some embodiments, at least two or more) of the multiple instructions, each such instruction is of a respective branch instruction type. One example indicator of such a branch instruction type is a length of an opcode of the given instruction (as determined by an instruction length decoder, for example).

Based on the detection of an event at 310, method 300 (at 312) provides branch information to a repository, such as a cache that, in some embodiments, is to function as a branch target buffer of an instruction fetch unit. For example, such an instruction fetch unit includes, is coupled to access, or is otherwise configured to operate with the repository.

In an embodiment, the branch information is descriptive of, and/or otherwise corresponds to, the branch instruction. For example, the branch information identifies the branch instruction as being of a particular instruction type—e.g., one of a direct call instruction type or a return call instruction type. In some embodiments, the branch information further identifies another instruction as being a target of the branch instruction. In some embodiments, additional information is provided based on a detection of the event. By way of illustration and not limitation, such information includes (or otherwise facilitates a determining of) index information, tag information, and/or metadata to be provided at the repository, as described elsewhere herein.

In the example embodiment shown, method 300 further comprises operations 302 which are performed with an evaluation circuit (such as that of evaluation unit 180) of an instruction fetch unit. Operations 302 comprise (at 314) receiving an indication—e.g., indicia 112—that the branch instruction is to be fetched, wherein the indication is based on an output of a branch prediction unit. Based on the indication received at 314, operations 302 (at 316) performs a search of the repository to access the branch information. Based on the search performed at 316, operations 302 (at 318) sends to the branch prediction unit a signal to clear a prediction of an instruction to be executed after the branch instruction.

Figure 4:
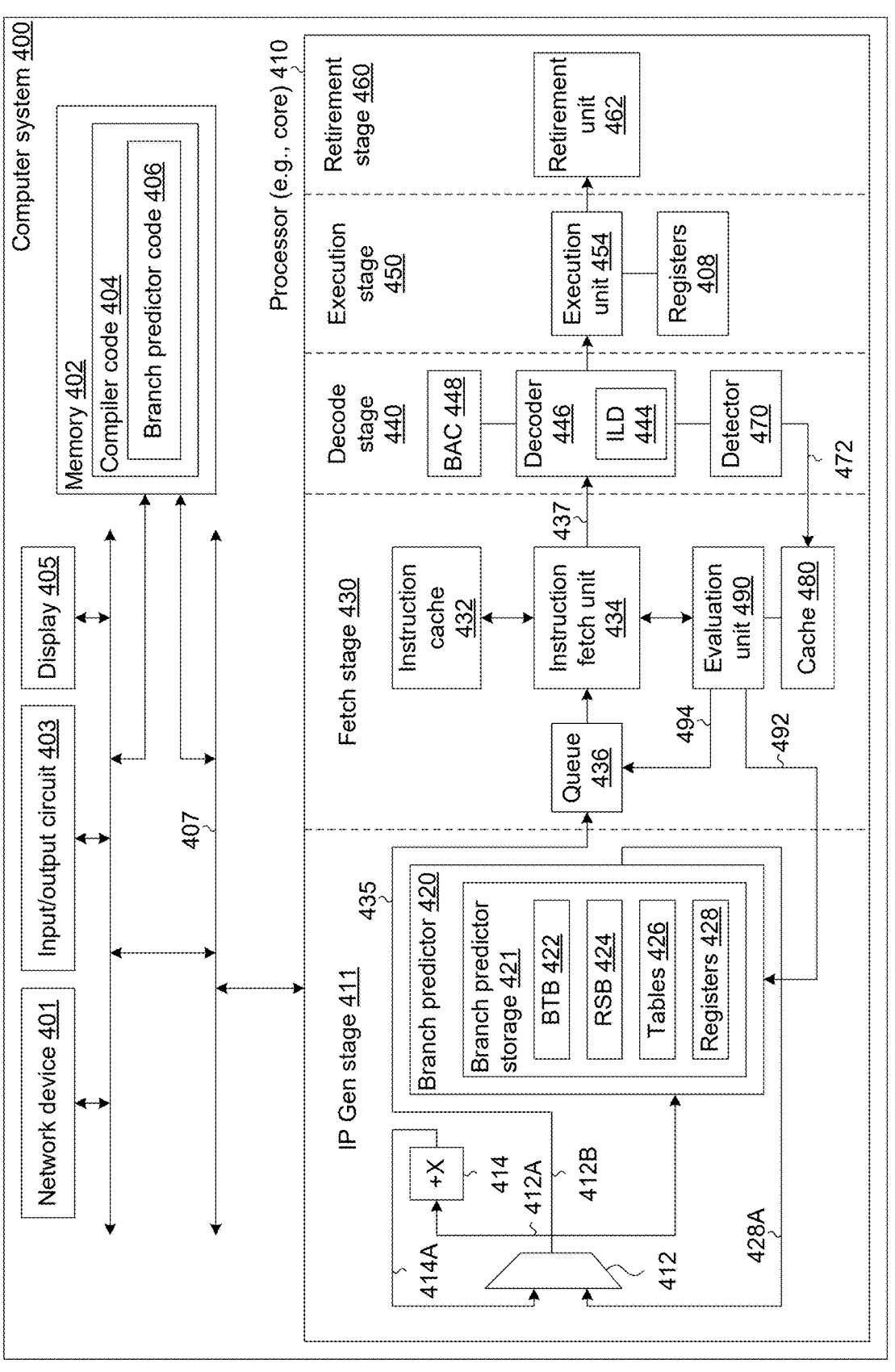
FIG. 4 is a functional block diagram showing features of a computer system including instruction fetch circuitry which operates based on branch information according to an embodiment.

FIG. 4 illustrates a computer system 400 including a branch predictor 420 in a pipelined processor 410 (e.g., processor core) according to embodiments of the disclosure. In one embodiment, processor core 100 in FIG. 1 is an instance of a processor core 410—e.g., wherein operations of method 300 are performed with processor core 410. In the depicted embodiment, each single processor (e.g., each core 410) includes an instance of branch predictor 420. Branch predictor 420 includes branch predictor storage 421. Branch predictor storage 421 includes a branch target buffer (BTB) 422, a return stack buffer 424 (RSB), history tables 426, registers 428, and/or other data storage structures. One or more of these are only used by a single branch predictor, or (alternatively) are maintained and/or used by any branch predictor of multiple branch predictors.

In certain embodiments, branch target buffer 422 stores (e.g., in a branch predictor array) the predicted target instruction corresponding to each of a plurality of branch instructions (e.g., branch instructions of a section of code that has been executed multiple times). In certain embodiments, return stack buffer 424 (RSB) is to store (e.g., in a stack data structure of last data in is the first data out (LIFO)) the return addresses of any direct call instructions (e.g., that push their return address on the stack). In certain embodiments, history tables 426 store history for each of multiple branches of code being performed by the processor 410, e.g., as discussed below. In certain embodiments, registers 428 include a register to store branch global path history and/or a register to store branch global direction history.

In one embodiment, processor 410 is a pipelined processor core that includes an instruction pointer generation (IP Gen) stage 411, a fetch stage 430, a decode stage 440, an execution stage 450, and a retirement stage 460. Each of the pipelined stages shown in processor core 410 includes varying levels of circuitry. Alternatively, the pipeline stages are sub-divided into a larger number of stages. Moreover, additional pipeline stages, such as a prefetch stage, may also be included.

The IP Gen stage 411, as depicted in FIG. 4, selects instruction pointers (e.g., memory addresses) which identify the next instruction in a program sequence that is to be fetched and executed by the core (e.g., logical core). In one embodiment, the IP Gen stage 411 increments the memory address of the most recently fetched instruction by a predetermined amount X (e.g., 1), each clock cycle.

However, in the case of an exception, or when a branch instruction is taken, the IP Gen stage 411 selects an instruction pointer identifying an instruction that is not the next sequential instruction in the program order. In certain embodiments, the IP Gen stage also predicts whether a conditional branch instruction is taken, for example, to decrease branch penalties.

The fetch stage 430, as depicted in FIG. 4, accepts instruction pointers from the IP Gen stage 411 and fetches the respective instruction from memory 402 or instruction cache 432. The decode stage 440 performs decode operations to decode an instruction into a decoded instruction. The execution stage 450 performs an operation as specified by a decoded instruction.

The retirement stage 460 retires the executed instruction, e.g., with the results of the executed instruction(s) (e.g., instructions taken for one direction after a conditional branch) are kept (e.g., made visible) if the branch prediction was correct and discarded (e.g., the effects rolled-back) if the branch prediction was incorrect. In alternative embodiments, the pipelined stages described above also include additional operations.

As one example, the IP Gen Stage 411 of the core (e.g., with IP Gen mux 412) selects an instruction pointer from a set of inputs, each of which are configured to provide an instruction pointer to the core (e.g., IP Gen mux 412). The inputs of the core (e.g., IP Gen mux 412) are pre-assigned with respective priorities to assist the IP Gen Stage 411 (e.g., IP Gen mux 412) in selecting which input will pass through the IP Gen Stage 411 (e.g., mux 412) onto the fetch stage 430. In the example embodiment shown, the input to fetch stage 430 is communicated to an instruction fetch unit 434 via a prediction queue 436.

As shown in FIG. 4, the IP Gen mux 412 receives an instruction pointer from line 414A. The instruction pointer provided via line 414A is generated by the incrementer circuit 414, which receives a copy of the most recent instruction pointer from the path 412A. The incrementer circuit 414 increments the present instruction pointer by a predetermined amount, to obtain the next sequential instruction from a program sequence presently being executed by the core.

The IP Gen mux 412 is also shown to be receiving an instruction pointer from the branch prediction line 428A. The instruction pointer provided via the branch prediction line 428A is generated by the Branch Predictor 420 (e.g., Branch Predictor Unit (BPU)), which is discussed in more detail below. In certain embodiments, the branch prediction line 428A provides the IP Gen mux 412 with the instruction corresponding to a predicted taken direction for a conditional instruction (or the instruction corresponding to a predicted not taken direction for a conditional instruction) and/or branch target (e.g., target instruction) for a branch instruction which the branch predictor has predicted. Additional input lines are received by the IP Gen mux 412, for example, lines to account for detecting exceptions and for correcting branch predictions are also received by the IP Gen mux 412.

In this example, an indicator of the instruction pointer (IP) (e.g., copy of the instruction pointer) selected by the IP Gen mux 412 is forwarded to the branch predictor 420 via line 412B. (Hereinafter for this section, the instruction pointer selected by the IP Gen mux 412 will be referred to as "the IP".) In certain embodiments, the branch predictor 420 includes or accesses storage having one or more entries, with each entry capable of storing data identifying a branch instruction and corresponding data identifying the predicted direction (e.g., taken or not taken) and/or the predicted branch target of the branch instruction.

In one embodiment, the branch instructions stored in the branch predictor 420 are pre-selected by a compiler from code to be executed. In certain embodiments, the compiler code 404, as shown stored in the memory 402 of FIG. 4, includes a sequence of code that, when executed, translates source code of a program written in a high-level language into executable machine code. Although some embodiments are not limited in this regard, the compiler code 404 further includes additional branch predictor code 406 that predicts a direction (e.g., taken or not taken) and/or a target instruction for branch instructions (for example, branch instructions that are likely to be taken (e.g., pre-selected branch instructions)). The branch predictor 420 (e.g., BTB 422 thereof) is thereafter updated with a direction prediction and/or a predicted target instruction for a branch instruction.

The depicted processor core 410 (e.g., at the branch predictor 420 thereof) facilitates access to one or more registers (e.g., registers 408 or registers 428). In certain embodiments, processor (e.g., core) include one or more of general purpose register(s) 408 and branch prediction history registers (e.g., registers 428).

In an illustrative scenario according to one embodiment, each entry for the branch predictor 420 (e.g., in storage 421 thereof) includes a tag field and a prediction field. In certain embodiments, each entry includes a target field indicating a predicted target instruction of an indirect branch instruction (e.g., for its tag) input into the branch predictor.

In one embodiment, the tag field of each entry in the branch predictor storage 421 stores at least a portion of an instruction pointer (e.g., memory address) identifying a branch instruction or a hash of that instruction pointer with branch prediction history.

In this example, once the branch predictor 420 receives the IP (e.g., from the IP Gen mux 412), the branch predictor 420 compares the received IP (e.g., a portion of the IP) with the (e.g., corresponding portion of the) tag field of each entry (e.g., in BTB 422 thereof). The branch predictor 420 performs the comparison to determine if the received IP (e.g., or hash thereof) corresponds (e.g., matches) to an entry therein. In one embodiment, the IP gen mux 412 selects the IP and the branch predictor 420 performs the compare operation within the same clock cycle. Alternatively, the compare operation of the branch predictor 420 occurs in a clock cycle following the selection of the IP.

If no match is found between the IP and the tag fields (e.g., in BTB 422), the next sequential IP is selected (e.g., by the IP Gen mux 412) as the next instruction to be fetched in certain embodiments. However, if the branch predictor 420 detects a match between the IP and a tag field (e.g., in BTB 422), an indicator (e.g., or copy of) of the predicted direction and/or the branch target corresponding to the matching tag field is sent to fetch unit 434. In one embodiment, the indicator (e.g., or copy thereof) for the predicted direction corresponding to the matching tag field is forwarded to the IP Gen mux 412, via the branch prediction line 428A, and the predicted direction is used to select the next instruction that corresponds to the condition being taken if the prediction is "taken" or the next instruction that corresponds to the condition being not taken if the prediction is "not taken". In another embodiment, the indicator (e.g., or copy of) for the branch target corresponding to the matching tag field is forwarded to the IP Gen mux 412, via the branch prediction line 428A. Assuming the branch prediction line 428A has the highest priority among the asserted lines received by the IP Gen mux 412, the next instruction that corresponds to the condition being taken if the prediction is "taken" or the next instruction that corresponds to the condition being not taken if the prediction is "not taken" (and/or the branch target) is passed onto the instruction fetch unit 434 via line 435 to begin fetching instruction(s) at the respective address. The fetched instruction is sent to the decoder 446 (e.g., via line 437) to be decoded, and the decoded instruction is sent to the execution unit 454 to be executed. The executed instruction is sent to the retirement unit 462 to be retired. In one embodiment, the retirement unit 462 causes an update of branch history (e.g., a correct prediction for a predicted branch) for a retired instruction. Depicted computer system 400 further includes a network device 401, input/output circuit 403 (e.g., keyboard), display 405, and a system bus (e.g., interconnect) 407.

Under some conditions—e.g., at a startup of computer system 400, or after a flush of BTB 422—branch predictor 420 and/or instruction cache 432 are "cold" with respect to one or more function calls. As a result, processor 410 is subject to mispredicting an execution of an instruction— e.g., by implicitly mispredicting that an instruction is not a branch instruction, or by mispredicting a target of a given branch instruction. For example, IP Gen Stage 411 and instruction fetch unit 434 are prevented from determining, at least initially, that a given instruction is of a branch type. In various instances, a fall through event occurs wherein instruction fetch unit 434 fetches multiple lines of instruction cache 432.

In an illustrative scenario according to one embodiment, a given one or more lines of instruction cache 432 have multiple instructions which are collectively or otherwise fetched by instruction fetch unit 434 as a set of instruction to be speculatively decoded, and at least potentially, executed. In one such embodiment, a sequence in which the multiple instructions are to be conditionally executed is based on, or otherwise according to, an order of the multiple instructions in instruction cache 432. However, an execution of one or more such decoded instructions is conditioned, at least in part, upon whether another one of the instructions is determined to be of a branch type (e.g., an unconditional branch type such as a direct call type or a return type).

In the example embodiment shown, decoder 446 includes or is coupled to operate with an instruction length decoder (ILD) 444 which receives, from instruction fetch unit 434, raw data for a given fetched instruction. Based on such data, ILD 444 determines which portion of the instruction is an opcode, and identifies a corresponding instruction type based (for example) on a length of said opcode. Based on the instruction type which is identified with ILD 444, detector 470 determines that a fall through event has occurred, wherein multiple fetched instructions include at least one branch instruction.

Based on the detected fall through event, detector 470 provides branch information 472, directly or indirectly, to a cache 480 which is accessible to an evaluation unit 490 of fetch stage 430. For a given branch instruction of a fall through event, cache 480 is to provide corresponding information that, for example, identifies a branch type of the instruction (e.g., one of a direct call type or a return type) and, for example, a target of the branch instruction (if any). In some embodiments, a cache line of cache 480 is to include, be indexed by, tagged or otherwise associated with information (e.g., metadata) which facilitates the identification of a corresponding instruction as being one of the multiple instructions associated with a previously-detected fall through event. In some embodiments, the fall through event further results in at least some branch instruction information (e.g., including predicted target information) being cleared from BTB 422 and/or other resources of branch predictor 420). In the example embodiment shown, processor 410 further comprises circuit logic-represented by the illustrative circuit BAC 448 shown-which sends a signal (not shown) for branch predictor 420 to clear one or more entries of BTB 422. For example, such a signal provides functionality of a BAClear signal used in various existing processor architectures.

In an embodiment, detector 470, cache 480, and evaluation unit 490 correspond functionally to detector 160, repository 170 and evaluation unit 180 (respectively). At some point after the branch information 472 is provided to cache 480, evaluation unit 490 receives or otherwise detects an indication—e.g., from prediction queue 436 and/or instruction fetch unit 434—that a particular instruction is to be fetched for decode stage 440. Based on the indication, evaluation unit 490 performs a search of cache 480 to determine whether a cache line thereof includes branch information corresponding to that particular instruction.

Where the search results in a miss of cache 480, evaluation unit 490 signals instruction fetch unit 434 to fetch the particular instruction from some other one or more resources including (for example) instruction cache 432, a memory 402, or the like. Where the search instead results in a hit of cache 480, evaluation unit 490 communicates a signal 492 (a BTClear signal, for example) to clear prediction information which branch predictor 420 includes or otherwise uses. By way of illustration and not limitation, signal 492 is to clear one or more (e.g., some or all) entries of BTB 422. In some embodiments, such a hit of cache 480 additionally or alternatively causes evaluation unit 490 to communicates a signal 494 which flushes some or all current entries in queue 436. Additionally or alternatively, such a hit of cache 480 causes evaluation unit 490 to identify to instruction fetch unit 434 another instruction as being a correct target of the branch instruction in question.

Figure 5:
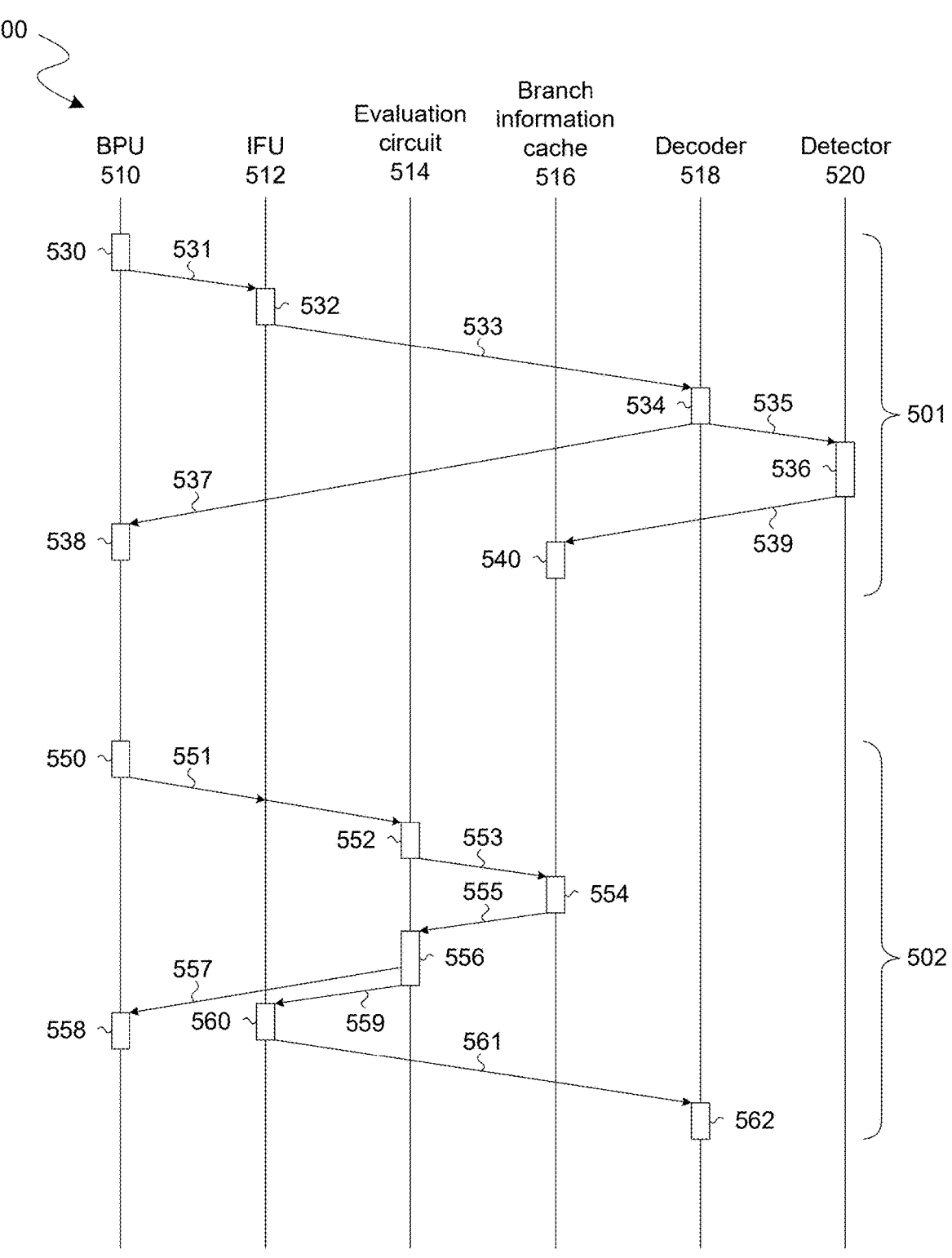
FIG. 5 is a timing diagram illustrating operations to provide branch information according to an embodiment.

FIG. 5 shows a sequence 500 of operations facilitate an accessing of branch information according to an embodiment. Sequence 500 demonstrates features of one example embodiment wherein, based on a fall through event, branch information is cached and made available to facilitate operations of a branch instruction unit and/or an instruction fetch unit. In an embodiment, sequence 500 is performed with processor core 100 or processor 410—e.g., wherein some or all of sequence 500 are based on (for example, include), or result in, operations of method 300.

As shown in FIG. 5, sequence 500 includes various communications between a branch prediction unit (BPU) 510, an instruction fetch unit (IFU) 512, an evaluation circuit 514, a branch information cache 516, a decoder 518, and a detector 520 which—for example—correspond functionally to branch predictor 420, instruction fetch unit 434, evaluation unit 490, cache 480, decoder 446, and detector 470 (respectively). In the example embodiment shown, sequence 500 includes operations 501 which provide branch information to a dedicated cache, and subsequent operations 502 which—based on said branch information—determine whether branch prediction resources are to be flushed and, for example, re-steered.

In an illustrative scenario according to one embodiment, BPU 510 performs operations 530 which determine one or more instruction pointer values, each corresponding to a respective instruction which is predicted to be executed. Based on operations 530, BPU 510 sends a signal 531 to identify to IFU 512 one or more instructions which are to be speculatively fetched and decoded for possible execution. In an embodiment, signal 531 explicitly or implicitly indicates that IFU 512 is to implement a "fall through" fetching of multiple instructions.

IFU 512 then performs operations 532 to fetch multiple instructions based on the one or more instruction pointer values identified in signal 531. Subsequently, IFU 512 sends raw data, representing the fetched multiple signals, in a signal 533 to decoder 518. Based on signal 533, decoder 518 performs operations 534 to at least partially decode some or all of the multiple instructions.

Detector 520 is coupled to receive, snoop, or otherwise detect information which is generated by the operations 534 of decoder 518. By way of illustration and not limitation, decoder 518 sends a signal 535 which identifies to detector 520 that a given instruction is determined to be a branch instruction. In some embodiments, signal 535 identifies to detector 520 a type of a given branch instruction—e.g., including a particular one of multiple unconditional branch instruction types including a direct call type, a jump type, and a return type. In one such embodiment, signal 535 further identifies a target (if any) of a given branch instruction.

Based on signal 535, detector 520 performs operations 536 which detect an occurrence of a fall though event wherein multiple fetched instructions (in this case, those identified with signal 533) include one or more branch instructions. In an embodiment, operations 536 further determine, for each of the one or more branch instructions, respective branch information which identifies a branch type of the branch instruction and, for example, a target (if any) of the branch instruction. Some or all such branch information is communicated, via the illustrative signal 539 shown—to branch information cache 516, which performs operations 540 to cache respective branch information for each of the one or more branch instructions detected by operations 536.

In various embodiments, decoder 518—or, for example, other logic (not shown) providing functionality such as that of BAC 448—directly or indirectly provides to BPU 510 an indication 537 that at least some branch prediction information is to be cleared (e.g., from one or more entries of a branch target buffer). Based on the indication 537, BPU 510 performs such clearing with the operations 538 shown.

At some point after operations 501, BPU 510 performs operations 550 (similar to operations 530) to determine one or more instruction pointer values which each correspond to a respective instruction that is predicted to be executed. Based on operations 550, BPU 510 sends a signal 551 which identifies one or more instructions which are to be speculatively fetched and decoded for possible execution. In an embodiment, signal 551 is received, snooped or otherwise detected by evaluation circuit 514—e.g., wherein evaluation circuit 514 receives signal 551 via IFU 512.

Based on signal 551 evaluation circuit 514 performs operations 552 to determine one or more criteria for searching branch information cache 516—e.g., to determine whether an instruction indicated by signal 551 corresponds to any currently cached branch information. In the example embodiment shown, signal 553 communicates the search criteria to branch information cache 516, wherein operations 554 are performed, based on the search criteria, to search the respective index values for one or more cache lines of branch information cache 516. Based on operations 554, evaluation circuit 514 receives a signal 555 which identifies whether the search has resulted in a hit or a miss of branch information cache 516.

In the example embodiment shown, signal 555 indicates a hit of branch information cache 516, causing evaluation circuit 514 to perform operations 556 to determine a clearing of branch prediction information from BPU 510 and/or any of various other suitable resources of the processor core. In one such embodiment, evaluation circuit 514 sends a signal 557 to indicate to BPU 510 that one or more entries of a branch target buffer are to be cleared—e.g., including an entry for a branch instruction which is specified or otherwise indicated by signal 551. For example, signal 557 provides functionality of a BTClear signal which is used in various existing processor architectures. Based on signal 557, BPU 510 performs operations 558 to flush or otherwise clear at least some entries of a branch target buffer. In some embodiments, evaluation circuit 514 further sends one or more signals (not shown) based on operations 556—e.g., to clear a queue (such as queue 436) of pending entries which each indicate a respective instruction to be fetched.

In some embodiments, evaluation circuit 514 further sends to IFU 512 a signal 559 which, based on operations 556, identifies a target of a branch instruction indicated by signal 551. For example, signal 559 identifies the target instruction as one to be executed in lieu of one or more instructions which, in a sequence of the multiple instructions, follow the branch instruction indicated by signal 551. Accordingly, signal 559 resteers the core from a speculative execution of the such one or more instructions to an alternative execution of the instruction which is actually targeted by the branch instruction in question. Based on signal 559, IFU 512 performs a fetch 560 of the indicated target instruction, which is sent via a signal 561 to decoder 518 for decoding 562 thereof, and subsequent execution (not shown).

FIG. 6 shows a way 600 of a cache which is to provide branch information according to an embodiment. In some embodiments, one of repository 170, cache 480 or branch information cache 516 includes way 600—e.g., wherein one or more operations of method 300 access way 600.

In various embodiments, way 600 provides branch information for two or more—e.g., up to two—branch instructions which, for example, are each a respective one of a direct call instruction or a return instruction. As shown in FIG. 6, way 600 comprises two lines 610a, 610b which are each to provide respective branch information for a corresponding branch instruction. In one such embodiment, line 610a comprises a field 612a to specify or otherwise indicate a branch instruction to which line 610a currently corresponds. Line 610a further comprises another field 614a to specify or otherwise indicate a target (if any) of the branch instruction to which line 610a currently corresponds. Similarly, line 610b comprises a field 612b to specify or otherwise indicate a branch instruction to which line 610b currently corresponds. Line 610b further comprises another field 614b to specify or otherwise indicate a target (if any) of the branch instruction to which line 610b currently corresponds.

In various embodiments, a given one of lines 610a, 610b is indexed using index bits (e.g., the last five index bits) of a corresponding line in an instruction cache—e.g., providing functionality of instruction cache 432—from which the branch instruction in question was previously fetched. In one such embodiment, a given one of fields 612a, 612b identifies a respective offset, with respect to a reference point of the corresponding line in an instruction cache, from where the branch instruction in question is to be fetched. In some embodiments, where a given line 610 of way 600 provides branch information for a return instruction, the respective field 614 of that given line 610 is set to zero (0) or some other value which is predetermined to indicate that the return instruction does not explicitly target another instruction (e.g., wherein the next instruction to be executed is accessible at a return stack buffer or other suitable data structure).

In an illustrative scenario according to one embodiment, a branch information repository which includes way 600 has a set-associative cache organization comprising (for example) 32 sets and 8 ways per set. Upon a hit of a particular one of lines 610a, 610b, the 6-bit offset of the respective field 612 is added to the corresponding line of the instruction cache to determine a pointer to the branch instruction in question. Furthermore, the 32-bit value in the respective field 614 identifies an offset for accessing a location of the instruction (if any) which is targeted by the branch instruction. For example, the offset is added to the instruction pointer for the branch instruction to determine the instruction pointer for the corresponding targeted instruction.

In some embodiments, way 600 further includes one or more fields 620 to store tag information, validity information and/or other metadata corresponding to the branch information in one or each of lines 610a, 610b. In one such embodiment, the metadata identifies the branch instruction in question as being one of multiple instructions that were fetched in a previous fall through event. For example, the metadata includes an identifier assigned to the multiple instructions, and/or indicates a relative location of the branch instruction in question in an order of the multiple instructions. In some embodiments, the metadata specifies or otherwise indicates a location of the branch instruction in question relative to a most recently executed branch instruction (if any) in the order of the multiple instructions. Some embodiments update the metadata, as one or more of the multiple instructions are variously executed, to indicate which is the next branch instruction in the order after the most recently executed branch instruction. As described below, such metadata facilitates the identification of branch prediction information which is to be cleared from a BPU, a BTB, a prediction queue, and/or the like.

Figure 7A:
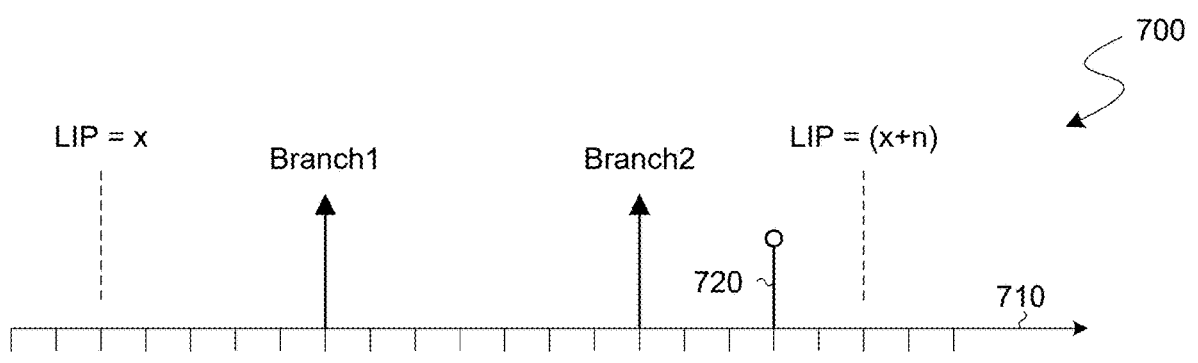
FIGS. 7A-7C are sequence diagrams showing respective instruction sequences each to provide a basis for determining a re-steering of a branch prediction unit according to a corresponding embodiment.
Figure 7B:
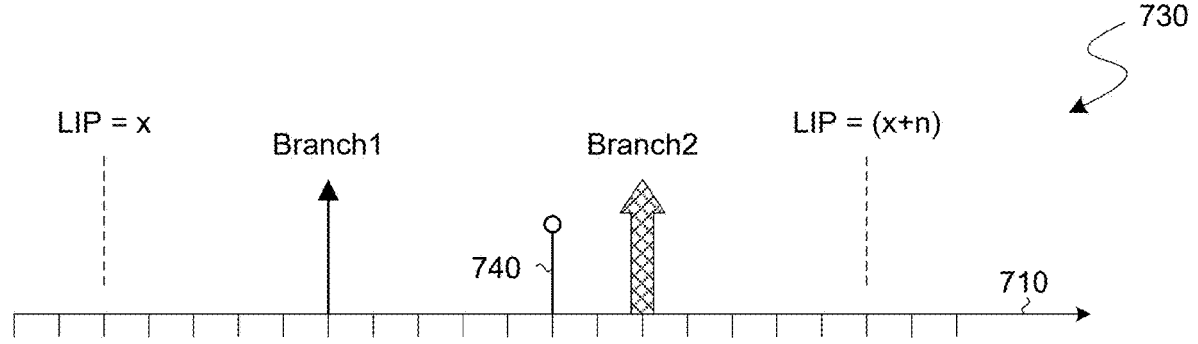
Figure 7C:
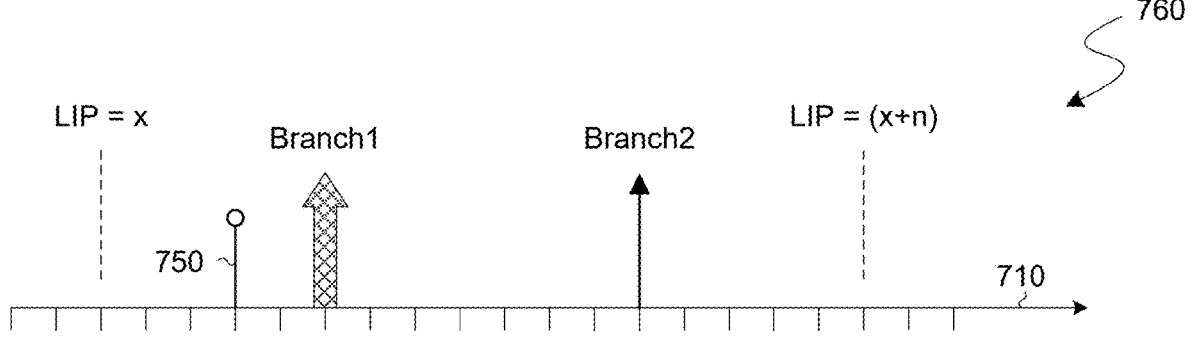

FIGS. 7A-7C shows various example scenarios 700, 730, 760 of how a branch instruction, in a sequence 710 of multiple instructions, is to be selected as a basis for determining whether—and if so, how—branch prediction information is to be cleared from a BPU, a BTB, a prediction queue and/or other suitable resource of a processor core. Example scenarios 700, 730, 760 illustrate operations performed with one of processor core 100, or processor 410, in some embodiments.

As shown in FIGS. 7A-7C, sequence 710 includes multiple instructions between a first linear instruction pointer (or "LIP") (x) and a second linear instruction pointer (x+n), where x and n are respective positive integers. In each of scenarios 700, 730, 760, the multiple instructions are each fetched as part of the same fall through event, and comprise one or more branch instructions (e.g., comprising the illustrative branch instructions Branch1, Branch2 shown).

To facilitate clearing of branch prediction information, some embodiments variously identify a particular instruction as being a most recently taken—i.e., most recently executed—target instruction of the multiple instructions (or alternatively, as being a most recently executed branch instruction, which targeted said particular instruction). Furthermore, such embodiments variously determine which branch instruction (if any) of the multiple instructions is a next branch instruction after the identified particular instruction. Further still, such embodiments variously signal a branch prediction unit, a branch target buffer, a prediction queue and/or any of various other suitable resource to flush or otherwise clear branch prediction information corresponding to the next branch instruction after the identified particular instruction By way of illustration and not limitation, in the illustrative scenario 700, evaluation logic (which provides functionality or evaluation unit 180 or evaluation unit 490, for example) determines that an instruction 720 is a most recently taken target instruction of the multiple instructions. Since instruction 720 is not followed by any other branch instruction of the multiple instructions, the evaluation logic foregoes clearing any branch prediction information based on said execution of instruction 720.

In the alterative scenario 730, the evaluation logic determines that an instruction 740 is a most recently taken target instruction of the multiple instructions. Since instruction Branch2 is the next branch instruction of the multiple instructions after instruction 740, the evaluation logic communicates one or more signals to clear—from a BPU, a BTB, a prediction queue and/or the like—branch prediction information for instruction Branch2.

In the alterative scenario 760, the evaluation logic determines that an instruction 750 is a most recently taken target instruction of the multiple instructions. Since instruction Branch1 is the next branch instruction of the multiple instructions after instruction 750, the evaluation logic communicates one or more signals to clear branch prediction information for instruction Branch1.

Exemplary Computer Architectures

Detailed below are describes of exemplary computer architectures. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable.

Figure 8:
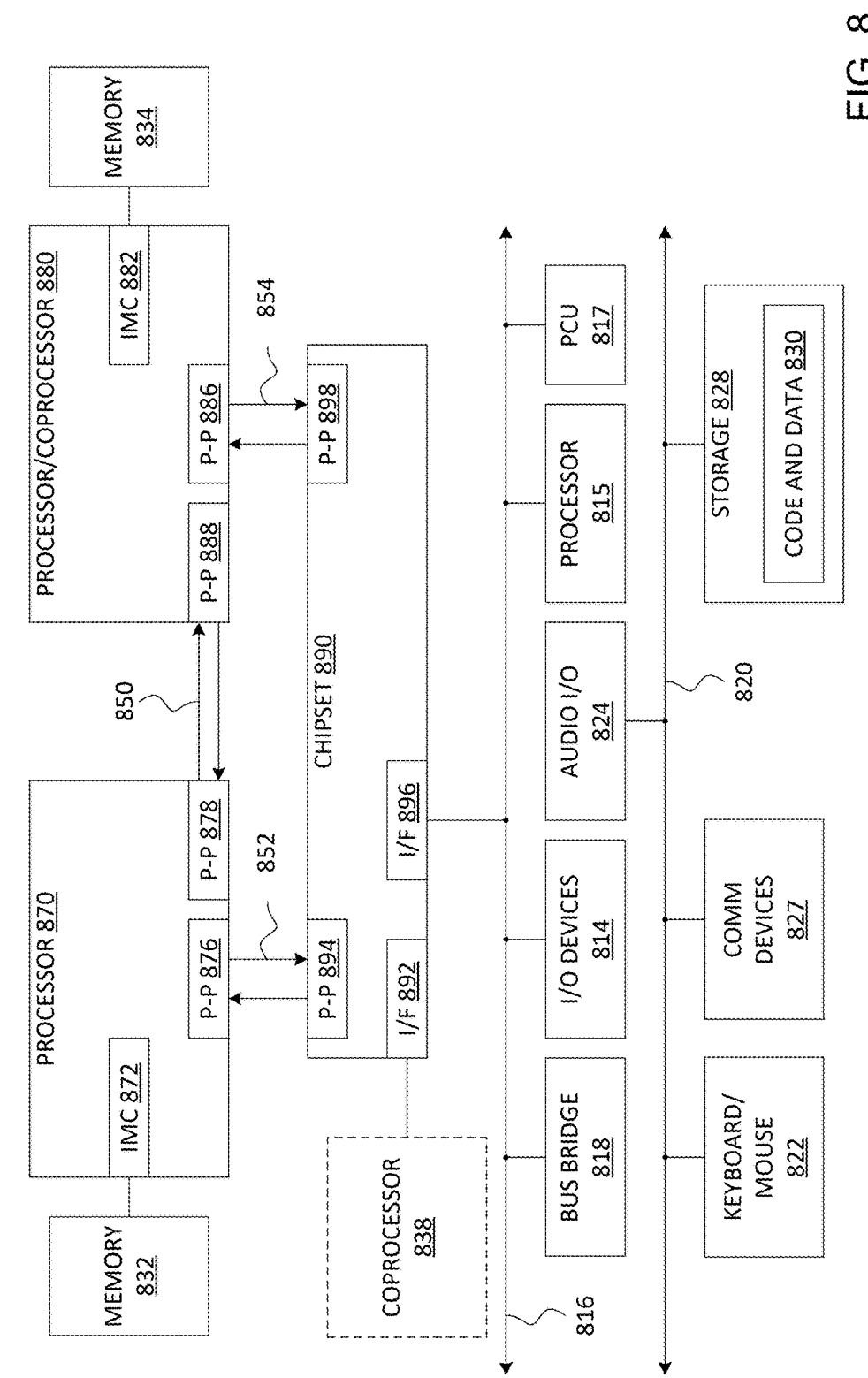
FIG. 8 illustrates an exemplary system.

FIG. 8 illustrates an exemplary system. Multiprocessor system 800 is a point-to-point interconnect system and includes a plurality of processors including a first processor 870 and a second processor 880 coupled via a point-to-point interconnect 850. In some examples, the first processor 870 and the second processor 880 are homogeneous. In some examples, first processor 870 and the second processor 880 are heterogenous. Though the exemplary system 800 is shown to have two processors, the system may have three or more processors, or may be a single processor system.

Processors 870 and 880 are shown including integrated memory controller (IMC) circuitry 872 and 882, respectively. Processor 870 also includes as part of its interconnect controller point-to-point (P-P) interfaces 876 and 878; similarly, second processor 880 includes P-P interfaces 886 and 888. Processors 870, 880 may exchange information via the point-to-point (P-P) interconnect 850 using P-P interface circuits 878, 888. IMCs 872 and 882 couple the processors 870, 880 to respective memories, namely a memory 832 and a memory 834, which may be portions of main memory locally attached to the respective processors.

Processors 870, 880 may each exchange information with a chipset 890 via individual P-P interconnects 852, 854 using point to point interface circuits 876, 894, 886, 898. Chipset 890 may optionally exchange information with a coprocessor 838 via an interface 892. In some examples, the coprocessor 838 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 870, 880 or outside of both processors, yet connected with the processors via P-P interconnect, such that either or both processors' local cache information may be stored in the shared cache if a processor is placed into a low power mode.

Chipset 890 may be coupled to a first interconnect 816 via an interface 896. In some examples, first interconnect 816 may be a Peripheral Component Interconnect (PCI) interconnect, or an interconnect such as a PCI Express interconnect or another I/O interconnect. In some examples, one of the interconnects couples to a power control unit (PCU) 817, which may include circuitry, software, and/or firmware to perform power management operations with regard to the processors 870, 880 and/or co-processor 838. PCU 817 provides control information to a voltage regulator (not shown) to cause the voltage regulator to generate the appropriate regulated voltage. PCU 817 also provides control information to control the operating voltage generated. In various examples, PCU 817 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 817 is illustrated as being present as logic separate from the processor 870 and/or processor 880. In other cases, PCU 817 may execute on a given one or more of cores (not shown) of processor 870 or 880. In some cases, PCU 817 may be implemented as a microcontroller (dedicated or general-purpose) or other control logic configured to execute its own dedicated power management code, sometimes referred to as P-code. In yet other examples, power management operations to be performed by PCU 817 may be implemented externally to a processor, such as by way of a separate power management integrated circuit (PMIC) or another component external to the processor. In yet other examples, power management operations to be performed by PCU 817 may be implemented within BIOS or other system software.

Various I/O devices 814 may be coupled to first interconnect 816, along with a bus bridge 818 which couples first interconnect 816 to a second interconnect 820. In some examples, one or more additional processor(s) 815, such as coprocessors, high-throughput many integrated core (MIC) processors, GPGPUs, accelerators (such as graphics accelerators or digital signal processing (DSP) units), field programmable gate arrays (FPGAs), or any other processor, are coupled to first interconnect 816. In some examples, second interconnect 820 may be a low pin count (LPC) interconnect. Various devices may be coupled to second interconnect 820 including, for example, a keyboard and/or mouse 822, communication devices 827 and a storage circuitry 828. Storage circuitry 828 may be one or more non-transitory machine-readable storage media as described below, such as a disk drive or other mass storage device which may include instructions/code and data 830 in some examples. Further, an audio I/O 824 may be coupled to second interconnect 820. Note that other architectures than the point-to-point architecture described above are possible. For example, instead of the point-to-point architecture, a system such as multiprocessor system 800 may implement a multi-drop interconnect or other such architecture.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 9:
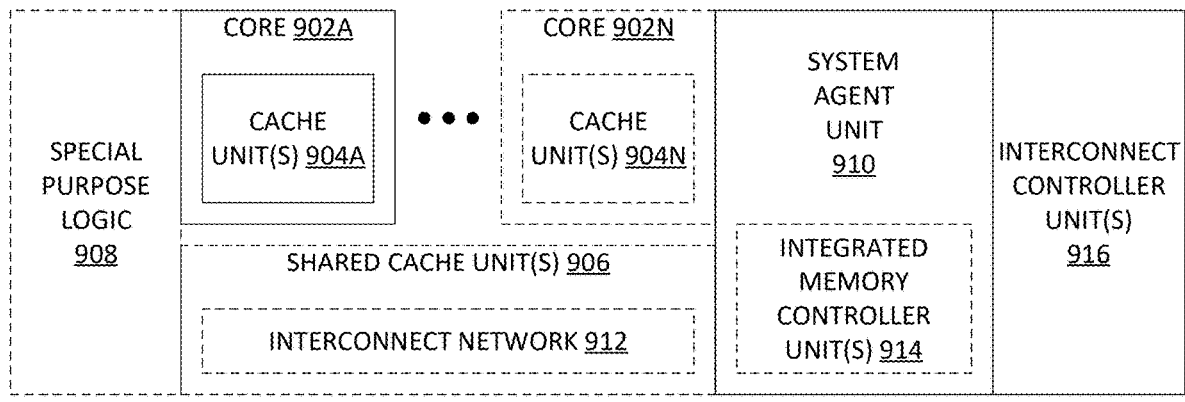
FIG. 9 illustrates a block diagram of an example processor that may have more than one core and an integrated memory controller.

FIG. 9 illustrates a block diagram of an example processor 900 that may have more than one core and an integrated memory controller. The solid lined boxes illustrate a processor 900 with a single core 902A, a system agent unit circuitry 910, a set of one or more interconnect controller unit(s) circuitry 916, while the optional addition of the dashed lined boxes illustrates an alternative processor 900 with multiple cores 902A-N, a set of one or more integrated memory controller unit(s) circuitry 914 in the system agent unit circuitry 910, and special purpose logic 908, as well as a set of one or more interconnect controller units circuitry 916. Note that the processor 900 may be one of the processors 870 or 880, or co-processor 838 or 815 of FIG. 8.

Thus, different implementations of the processor 900 may include: 1) a CPU with the special purpose logic 908 being integrated graphics and/or scientific (throughput) logic (which may include one or more cores, not shown), and the cores 902A-N being one or more general purpose cores (e.g., general purpose in-order cores, general purpose out-of-order cores, or a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 904A-N within the cores 902A-N, a set of one or more shared cache unit(s) circuitry 906, and external memory (not shown) coupled to the set of integrated memory controller unit(s) circuitry 914. The set of one or more shared cache unit(s) circuitry 906 may include one or more mid-level caches, such as level 2 (L2), level 3 (L3), level 4 (L4), or other levels of cache, such as a last level cache (LLC), and/or combinations thereof. While in some examples ring-based interconnect network circuitry 912 interconnects the special purpose logic 908 (e.g., integrated graphics logic), the set of shared cache unit(s) circuitry 906, and the system agent unit circuitry 910, alternative examples use any number of well-known techniques for interconnecting such units. In some examples, coherency is maintained between one or more of the shared cache unit(s) circuitry 906 and cores 902A-N.

In some examples, one or more of the cores 902A-N are capable of multi-threading. The system agent unit circuitry 910 includes those components coordinating and operating cores 902A-N. The system agent unit circuitry 910 may include, for example, power control unit (PCU) circuitry and/or display unit circuitry (not shown). The PCU may be or may include logic and components needed for regulating the power state of the cores 902A-N and/or the special purpose logic 908 (e.g., integrated graphics logic). The display unit circuitry is for driving one or more externally connected displays.

The cores 902A-N may be homogenous in terms of instruction set architecture (ISA). Alternatively, the cores 902A-N may be heterogeneous in terms of ISA; that is, a subset of the cores 902A-N may be capable of executing an ISA, while other cores may be capable of executing only a subset of that ISA or another ISA.

Exemplary Core Architectures-in-order and Out-of-order Core Block Diagram

FIG. 10A is a block diagram illustrating both an exemplary in-order pipeline and an exemplary register renaming, out-of-order issue/execution pipeline according to examples. FIG. 10B is a block diagram illustrating both an exemplary example of an in-order architecture core and an exemplary register renaming, out-of-order issue/execution architecture core to be included in a processor according to examples. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, an optional length decoding stage 1004, a decode stage 1006, an optional allocation (Alloc) stage 1008, an optional renaming stage 1010, a schedule (also known as a dispatch or issue) stage 1012, an optional register read/memory read stage 1014, an execute stage 1016, a write back/memory write stage 1018, an optional exception handling stage 1022, and an optional commit stage 1024. One or more operations can be performed in each of these processor pipeline stages. For example, during the fetch stage 1002, one or more instructions are fetched from instruction memory, and during the decode stage 1006, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 1006 and the register read/memory read stage 1014 may be combined into one pipeline stage. In one example, during the execute stage 1016, the decoded instructions may be executed, LSU address/data pipelining to an Advanced Microcontroller Bus (AMB) interface may be performed, multiply and add operations may be performed, arithmetic operations with branch results may be performed, etc.

By way of example, the exemplary register renaming, out-of-order issue/execution architecture core of FIG. 10B may implement the pipeline 1000 as follows: 1) the instruction fetch circuitry 1038 performs the fetch and length decoding stages 1002 and 1004; 2) the decode circuitry 1040 performs the decode stage 1006; 3) the rename/allocator unit circuitry 1052 performs the allocation stage 1008 and renaming stage 1010; 4) the scheduler(s) circuitry 1056 performs the schedule stage 1012; 5) the physical register file(s) circuitry 1058 and the memory unit circuitry 1070 perform the register read/memory read stage 1014; the execution cluster(s) 1060 perform the execute stage 1016; 6) the memory unit circuitry 1070 and the physical register file(s) circuitry 1058 perform the write back/memory write stage 1018; 7) various circuitry may be involved in the exception handling stage 1022; and 8) the retirement unit circuitry 1054 and the physical register file(s) circuitry 1058 perform the commit stage 1024.

FIG. 10B shows a processor core 1090 including front-end unit circuitry 1030 coupled to an execution engine unit circuitry 1050, and both are coupled to a memory unit circuitry 1070. The core 1090 may be a reduced instruction set architecture computing (RISC) core, a complex instruction set architecture computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit circuitry 1030 may include branch prediction circuitry 1032 coupled to an instruction cache circuitry 1034, which is coupled to an instruction translation lookaside buffer (TLB) 1036, which is coupled to instruction fetch circuitry 1038, which is coupled to decode circuitry 1040. In one example, the instruction cache circuitry 1034 is included in the memory unit circuitry 1070 rather than the front-end circuitry 1030. The decode circuitry 1040 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 1040 may further include an address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 1040 may be implemented using various different mechanisms. Examples of suitable mechanisms include, but are not limited to, look-up tables, hardware implementations, programmable logic arrays (PLAs), microcode read only memories (ROMs), etc. In one example, the core 1090 includes a microcode ROM (not shown) or other medium that stores microcode for certain macroinstructions (e.g., in decode circuitry 1040 or otherwise within the front end circuitry 1030). In one example, the decode circuitry 1040 includes a micro-operation (micro-op) or operation cache (not shown) to hold/cache decoded operations, micro-tags, or micro-operations generated during the decode or other stages of the processor pipeline 1000. The decode circuitry 1040 may be coupled to rename/allocator unit circuitry 1052 in the execution engine circuitry 1050.

The execution engine circuitry 1050 includes the rename/allocator unit circuitry 1052 coupled to a retirement unit circuitry 1054 and a set of one or more scheduler(s) circuitry 1056. The scheduler(s) circuitry 1056 represents any number of different schedulers, including reservations stations, central instruction window, etc. In some examples, the scheduler(s) circuitry 1056 can include arithmetic logic unit (ALU) scheduler/scheduling circuitry, ALU queues, arithmetic generation unit (AGU) scheduler/scheduling circuitry, AGU queues, etc. The scheduler(s) circuitry 1056 is coupled to the physical register file(s) circuitry 1058. Each of the physical register file(s) circuitry 1058 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 1058 includes vector registers unit circuitry, write-mask registers unit circuitry, and scalar register unit circuitry. These register units may provide architectural vector registers, vector mask registers, general-purpose registers, etc. The physical register file(s) circuitry 1058 is coupled to the retirement unit circuitry 1054 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1054 and the physical register file(s) circuitry 1058 are coupled to the execution cluster(s) 1060. The execution cluster(s) 1060 includes a set of one or more execution unit(s) circuitry 1062 and a set of one or more memory access circuitry 1064. The execution unit(s) circuitry 1062 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 1056, physical register file(s) circuitry 1058, and execution cluster(s) 1060 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 1064). It should also be understood that where separate pipelines are used, one or more of these pipelines may be out-of-order issue/execution and the rest in-order.

In some examples, the execution engine unit circuitry 1050 may perform load store unit (LSU) address/data pipelining to an Advanced Microcontroller Bus (AMB) interface (not shown), and address phase and writeback, data phase load, store, and branches.

The set of memory access circuitry 1064 is coupled to the memory unit circuitry 1070, which includes data TLB circuitry 1072 coupled to a data cache circuitry 1074 coupled to a level 2 (L2) cache circuitry 1076. In one exemplary example, the memory access circuitry 1064 may include a load unit circuitry, a store address unit circuit, and a store data unit circuitry, each of which is coupled to the data TLB circuitry 1072 in the memory unit circuitry 1070. The instruction cache circuitry 1034 is further coupled to the level 2 (L2) cache circuitry 1076 in the memory unit circuitry 1070. In one example, the instruction cache 1034 and the data cache 1074 are combined into a single instruction and data cache (not shown) in L2 cache circuitry 1076, a level 3 (L3) cache circuitry (not shown), and/or main memory. The L2 cache circuitry 1076 is coupled to one or more other levels of cache and eventually to a main memory.

The core 1090 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 1090 includes logic to support a packed data instruction set architecture extension (e.g., AVX1, AVX2), thereby allowing the operations used by many multimedia applications to be performed using packed data.

Exemplary Execution Unit(s) Circuitry

Figure 11:
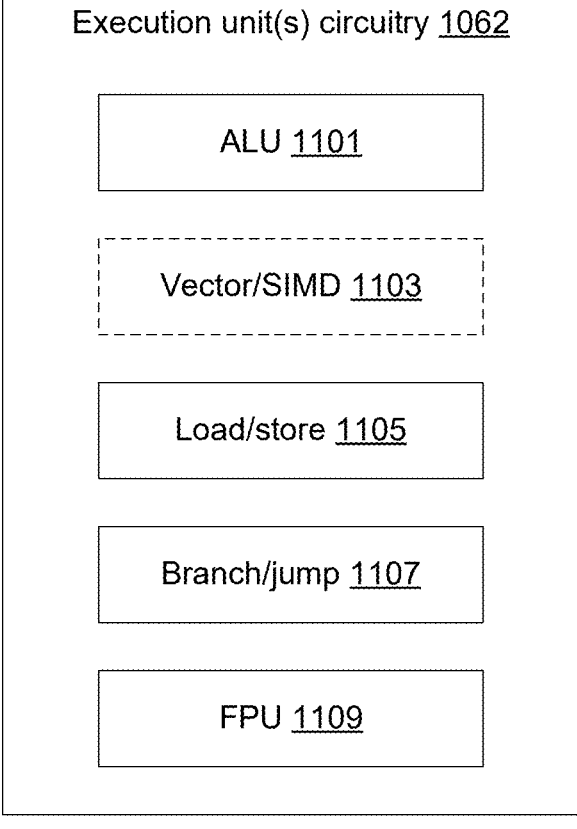
FIG. 11 illustrates examples of execution unit(s) circuitry.

FIG. 11 illustrates examples of execution unit(s) circuitry, such as execution unit(s) circuitry 1062 of FIG. 10B. As illustrated, execution unit(s) circuity 1062 may include one or more ALU circuits 1101, optional vector/single instruction multiple data (SIMD) circuits 1103, load/store circuits 1105, branch/jump circuits 1107, and/or Floating-point unit (FPU) circuits 1109. ALU circuits 1101 perform integer arithmetic and/or Boolean operations. Vector/SIMD circuits 1103 perform vector/SIMD operations on packed data (such as SIMD/vector registers). Load/store circuits 1105 execute load and store instructions to load data from memory into registers or store from registers to memory. Load/store circuits 1105 may also generate addresses. Branch/jump circuits 1107 cause a branch or jump to a memory address depending on the instruction. FPU circuits 1109 perform floating-point arithmetic. The width of the execution unit(s) circuitry 1062 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Exemplary Register Architecture

Figure 12:
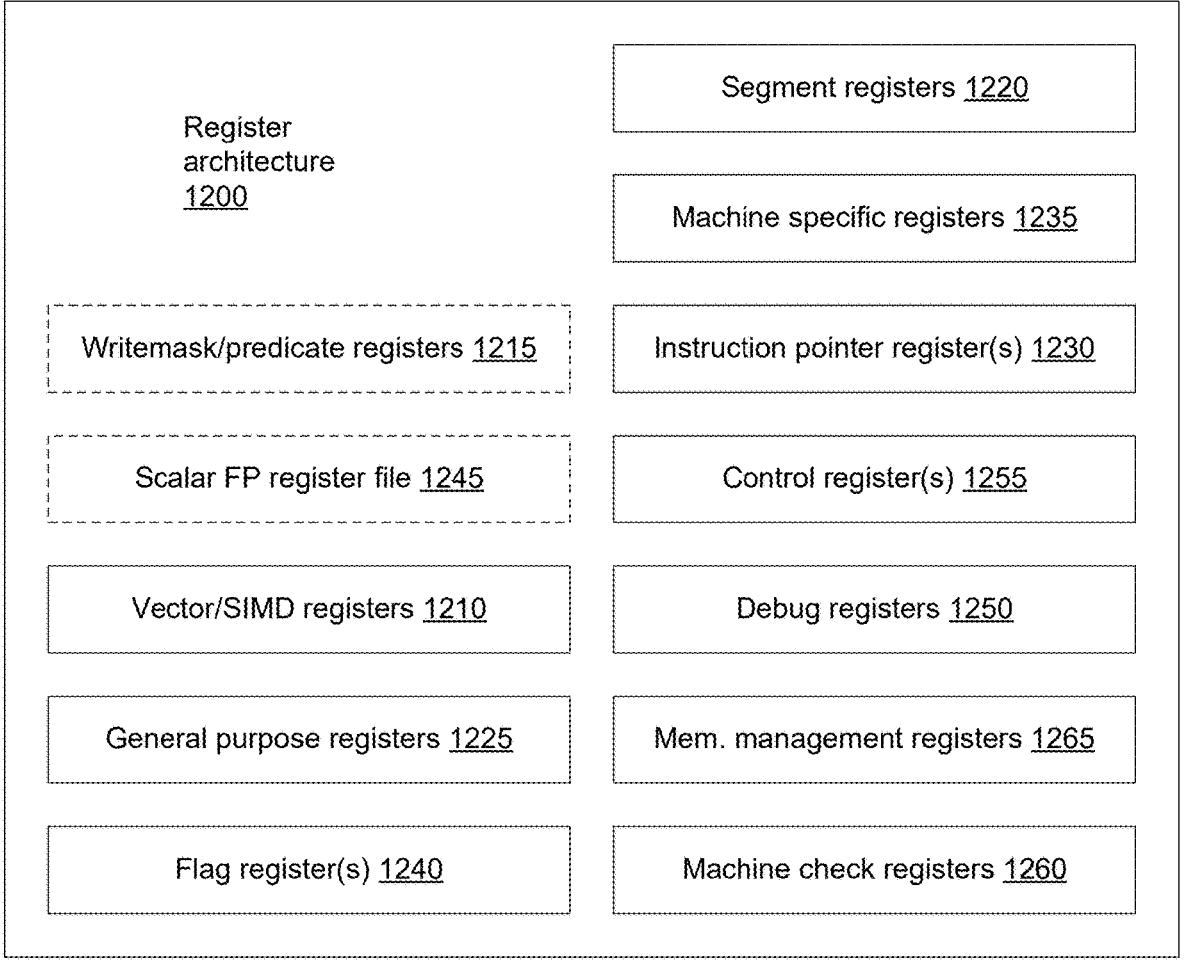
FIG. 12 is a block diagram of a register architecture according to some examples.

FIG. 12 is a block diagram of a register architecture 1200 according to some examples. As illustrated, the register architecture 1200 includes vector/SIMD registers 1210 that vary from 128-bit to 1,024 bits width. In some examples, the vector/SIMD registers 1210 are physically 512-bits and, depending upon the mapping, only some of the lower bits are used. For example, in some examples, the vector/SIMD registers 1210 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 1200 includes writemask/predicate registers 1215. For example, in some examples, there are 8 writemask/predicate registers (sometimes called k0 through k7) that are each 16-bit, 32-bit, 64-bit, or 128-bit in size. Writemask/predicate registers 1215 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 1215 corresponds to a data element position of the destination. In other examples, the writemask/predicate registers 1215 are scalable and consists of a set number of enable bits for a given vector element (e.g., 8 enable bits per 64-bit vector element).

The register architecture 1200 includes a plurality of general-purpose registers 1225. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 1200 includes scalar floating-point (FP) register 1245 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 1240 (e.g., EFLAGS, RFLAGS, etc.) store status and control information for arithmetic, compare, and system operations. For example, the one or more flag registers 1240 may store condition code information such as carry, parity, auxiliary carry, zero, sign, and overflow. In some examples, the one or more flag registers 1240 are called program status and control registers.

Segment registers 1220 contain segment points for use in accessing memory. In some examples, these registers are referenced by the names CS, DS, SS, ES, FS, and GS.

Machine specific registers (MSRs) 1235 control and report on processor performance. Most MSRs 1235 handle system-related functions and are not accessible to an application program. Machine check registers 1260 consist of control, status, and error reporting MSRs that are used to detect and report on hardware errors.

One or more instruction pointer register(s) 1230 store an instruction pointer value. Control register(s) 1255 (e.g., CR0-CR4) determine the operating mode of a processor (e.g., processor 870, 880, 838, 815, and/or 900) and the characteristics of a currently executing task. Debug registers 1250 control and allow for the monitoring of a processor or core's debugging operations.

Memory (mem) management registers 1265 specify the locations of data structures used in protected mode memory management. These registers may include a GDTR, IDRT, task register, and a LDTR register.

Alternative examples may use wider or narrower registers. Additionally, alternative examples may use more, less, or different register files and registers. The register architecture 1200 may, for example, be used in physical register file(s) circuitry 1058.

In one or more first embodiments, an integrated circuit (IC) comprises a detector unit to be coupled to a decoder unit, the detector unit to monitor operations of the decoder unit to detect an event wherein multiple instructions are fetched, wherein the multiple instructions comprise a branch instruction, and an instruction fetch unit to be coupled to a branch prediction unit, and to the decoder unit, the instruction fetch unit comprising a repository coupled to the detector unit, wherein, based on the event, the repository is to receive from the detector unit branch information which corresponds to the branch instruction, and an evaluation circuit coupled to the repository, the evaluation unit to receive an indication that the branch instruction is to be fetched, wherein the indication is based on an output of the branch prediction unit, based on the indication, perform a search of the repository to access the branch information, and based on the search, send to the branch prediction unit a signal to clear a prediction of an instruction to be executed after the branch instruction.

In one or more second embodiments, further to the first embodiment, the branch information comprises an identifier of another instruction as a target of the branch instruction, and based on the search, the evaluation circuit is further to output a signal to fetch the other instruction.

In one or more third embodiments, further to the first embodiment or the second embodiment, the branch information is to comprise a decoded version of the branch instruction.

In one or more fourth embodiments, further to any of the first through third embodiments, the signal to clear the prediction comprises the signal to clear one or more entries from a branch target buffer which is coupled to the branch prediction unit.

In one or more fifth embodiments, further to any of the first through fourth embodiments, based on the search, the evaluation circuit is further to send another signal to clear one or more entries of a prediction queue which is coupled between the branch prediction unit and the evaluation circuit.

In one or more sixth embodiments, further to any of the first through fifth embodiments, based on the event, the detector unit is to provide to the repository respective branch information for each direct call instruction of the multiple instructions.

In one or more seventh embodiments, further to the sixth embodiment, each direct call instruction of the multiple instructions is to correspond to a different respective return instruction of one or more return instructions, and wherein, based on the event, the detector unit is to provide to the repository respective branch information for each of the one or more return instructions.

In one or more eighth embodiments, further to any of the first through sixth embodiments, the instruction fetch unit is to fetch instructions from a first cache, the repository comprises a second cache, and the detector unit is to cache the branch information to a line of the second cache based on the event.

In one or more ninth embodiments, further to the eighth embodiment, the line of the second cache is to be indexed based on a corresponding line of the first cache.

In one or more tenth embodiments, further to the eighth embodiment, for each branch instruction of the multiple instructions which is of a direct call instruction type or of a return instruction type, the detector unit is to cache branch information, which corresponds to the branch instruction, to a different respective line of the second cache based on the event.

In one or more eleventh embodiments, further to the eighth embodiment, based on the event, the line of the second cache is to be tagged with metadata which identifies the branch instruction as being one of the multiple instructions.

In one or more twelfth embodiments, further to the eleventh embodiment, the metadata is further to indicate a relative location of the branch instruction in a sequence of the multiple instructions.

In one or more thirteenth embodiments, further to the twelfth embodiment, the metadata is further to indicate a location of the branch instruction relative to a most recently executed branch instruction in a sequence of the multiple instructions.

In one or more fourteenth embodiments, further to any of the first through sixth embodiments, the branch instruction, the branch information, the indication, the prediction, the search, and the signal are, respectively, a first branch instruction, first branch information, a first indication, a first prediction, a first search, and a first signal, the multiple instructions further comprise a second branch instruction that, in a sequence of the multiple instructions, is after the first branch instruction, based on the event, the repository is further to receive from the detector unit second branch information which corresponds to the second branch instruction, and the evaluation circuit is further to receive a second indication that the second branch instruction is to be fetched, wherein the second indication is based on the output of the branch prediction unit, based on the second indication, perform a second search of the repository to access the second branch information, and based on the second search, send to the branch prediction unit a second signal to clear a prediction of another instruction to be executed after the second branch instruction.

In one or more fifteenth embodiments, a system comprises a processor core comprising a detector unit to be coupled to a decoder unit, the detector unit to monitor operations of the decoder unit to detect an event wherein multiple instructions are fetched, wherein the multiple instructions comprise a branch instruction, and an instruction fetch unit to be coupled to a branch prediction unit, and to the decoder unit, the instruction fetch unit comprising a repository coupled to the detector unit, wherein, based on the event, the repository is to receive from the detector unit branch information which corresponds to the branch instruction, and an evaluation circuit coupled to the repository, the evaluation unit to receive an indication that the branch instruction is to be fetched, wherein the indication is based on an output of the branch prediction unit, based on the indication, perform a search of the repository to access the branch information, and based on the search, send to the branch prediction unit a signal to clear a prediction of an instruction to be executed after the branch instruction, a memory controller coupled to the processor core, and a memory coupled to the memory controller, the memory to store information which is accessible to the processor core via the memory controller.

In one or more sixteenth embodiments, further to the fifteenth embodiment, the branch information comprises an identifier of another instruction as a target of the branch instruction, and based on the search, the evaluation circuit is further to output a signal to fetch the other instruction.

In one or more seventeenth embodiments, further to the fifteenth embodiment or the sixteenth embodiment, the branch information is to comprise a decoded version of the branch instruction.

In one or more eighteenth embodiments, further to any of the fifteenth through seventeenth embodiments, the signal to clear the prediction comprises the signal to clear one or more entries from a branch target buffer which is coupled to the branch prediction unit.

In one or more nineteenth embodiments, further to any of the fifteenth through eighteenth embodiments, based on the search, the the evaluation circuit is further to send another signal to clear one or more entries of a prediction queue which is coupled between the branch prediction unit and the evaluation circuit.

In one or more twentieth embodiments, further to any of the fifteenth through nineteenth embodiments, based on the event, the detector unit is to provide to the repository respective branch information for each direct call instruction of the multiple instructions.

In one or more twenty-first embodiments, further to the twentieth embodiment, each direct call instruction of the multiple instructions is to correspond to a different respective return instruction of one or more return instructions, and wherein, based on the event, the detector unit is to provide to the repository respective branch information for each of the one or more return instructions.

In one or more twenty-second embodiments, further to any of the fifteenth through nineteenth embodiments, the instruction fetch unit is to fetch instructions from a first cache, the repository comprises a second cache, and the detector unit is to cache the branch information to a line of the second cache based on the event.

In one or more twenty-third embodiments, further to the twenty-second embodiment, the line of the second cache is to be indexed based on a corresponding line of the first cache.

In one or more twenty-fourth embodiments, further to the twenty-second embodiment, for each branch instruction of the multiple instructions which is of a direct call instruction type or of a return instruction type, the detector unit is to cache branch information, which corresponds to the branch instruction, to a different respective line of the second cache based on the event.

In one or more twenty-fifth embodiments, further to the twenty-second embodiment, based on the event, the line of the second cache is to be tagged with metadata which identifies the branch instruction as being one of the multiple instructions.

In one or more twenty-sixth embodiments, further to the twenty-fifth embodiment, the metadata is further to indicate a relative location of the branch instruction in a sequence of the multiple instructions.

In one or more twenty-seventh embodiments, further to the twenty-sixth embodiment, the metadata is further to indicate a location of the branch instruction relative to a most recently executed branch instruction in a sequence of the multiple instructions.

In one or more twenty-eighth embodiments, further to any of the fifteenth through nineteenth embodiments, the branch instruction, the branch information, the indication, the prediction, the search, and the signal are, respectively, a first branch instruction, first branch information, a first indication, a first prediction, a first search, and a first signal, the multiple instructions further comprise a second branch instruction that, in a sequence of the multiple instructions, is after the first branch instruction, based on the event, the repository is further to receive from the detector unit second branch information which corresponds to the second branch instruction, and the evaluation circuit is further to receive a second indication that the second branch instruction is to be fetched, wherein the second indication is based on the output of the branch prediction unit, based on the second indication, perform a second search of the repository to access the second branch information, and based on the second search, send to the branch prediction unit a second signal to clear a prediction of another instruction to be executed after the second branch instruction.

In one or more twenty-ninth embodiments, a method at a processor, the method comprises monitoring operations of a decoder unit to detect an event wherein multiple instructions are fetched, wherein the multiple instructions comprise a branch instruction, based on the event, providing branch information to a repository of an instruction fetch unit, wherein the branch information corresponds to the branch instruction, and with an evaluation circuit of the instruction fetch unit receiving an indication that the branch instruction is to be fetched, wherein the indication is based on an output of a branch prediction unit, based on the indication, performing a search of the repository to access the branch information, and based on the search, sending to the branch prediction unit a signal to clear a prediction of an instruction to be executed after the branch instruction.

In one or more thirtieth embodiments, further to the twenty-ninth embodiment, the branch information comprises an identifier of another instruction as a target of the branch instruction, and the method further comprises with the evaluation circuit, outputting a signal to fetch the other instruction based on the search.

In one or more thirty-first embodiments, further to the twenty-ninth embodiment or the thirtieth embodiment, the branch information comprises a decoded version of the branch instruction.

In one or more thirty-second embodiments, further to any of the twenty-ninth through thirty-first embodiments, the signal to clear the prediction comprises the signal to clear one or more entries from a branch target buffer which is coupled to the branch prediction unit.

In one or more thirty-third embodiments, further to any of the twenty-ninth through thirty-second embodiments, the method further comprises at the evaluation circuit based on the search, sending another signal to clear one or more entries of a prediction queue which is coupled between the branch prediction unit and the evaluation circuit.

In one or more thirty-fourth embodiments, further to any of the twenty-ninth through thirty-third embodiments, based on the event, the repository receives respective branch information for each direct call instruction of the multiple instructions.

In one or more thirty-fifth embodiments, further to the thirty-fourth embodiment, each direct call instruction of the multiple instructions corresponds to a different respective return instruction of one or more return instructions, and wherein, based on the event, the repository receives respective branch information for each of the one or more return instructions.

In one or more thirty-sixth embodiments, further to any of the twenty-ninth through thirty-third embodiments, the instruction fetch unit fetches instructions from a first cache, the repository comprises a second cache, and providing the branch information to the repository comprises caching the branch information to a line of the second cache.

In one or more thirty-seventh embodiments, further to the thirty-sixth embodiment, the line of the second cache is indexed based on a corresponding line of the first cache.

In one or more thirty-eighth embodiments, further to the thirty-sixth embodiment, for each branch instruction of the multiple instructions which is of a direct call instruction type or of a return instruction type, a different respective line of the second cache receives branch information corresponding to the branch instruction based on the event.

In one or more thirty-ninth embodiments, further to the thirty-sixth embodiment, based on the event, the line of the second cache is tagged with metadata which identifies the branch instruction as being one of the multiple instructions.

In one or more fortieth embodiments, further to the thirty-ninth embodiment, the metadata further indicates a relative location of the branch instruction in a sequence of the multiple instructions.

In one or more forty-first embodiments, further to the fortieth embodiment, the metadata further indicates a location of the branch instruction relative to a most recently executed branch instruction in a sequence of the multiple instructions.

In one or more forty-second embodiments, further to any of the twenty-ninth through thirty-third embodiments, the branch instruction, the branch information, the indication, the prediction, the search, and the signal are, respectively, a first branch instruction, first branch information, a first indication, a first prediction, a first search, and a first signal, the multiple instructions further comprise a second branch instruction that, in a sequence of the multiple instructions, is after the first branch instruction, the method further comprises based on the event, providing second branch information to the repository, wherein the second branch information corresponds to the second branch instruction, and with the evaluation circuit receiving a second indication that the second branch instruction is to be fetched, wherein the second indication is based on the output of the branch prediction unit, based on the second indication, performing a second search of the repository to access the second branch information, and based on the second search, sending to the branch prediction unit a second signal to clear a prediction of another instruction to be executed after the second branch instruction.

Techniques and architectures for determining a target of a branch instruction are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMS, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:
1. An integrated circuit (IC) comprising:
a detector circuit to be coupled to a decoder circuit, the detector circuit to monitor operations of the decoder circuit to detect an event wherein multiple instructions are fetched, wherein the multiple instructions comprise a branch instruction; and an instruction fetch circuit to be coupled to a branch prediction circuit, and to the decoder circuit, the instruction fetch circuit comprising:

a repository coupled to the detector circuit, wherein, based on the event, the repository is to receive from the detector circuit branch information which corresponds to the branch instruction; and an evaluation circuit coupled to the repository, the evaluation circuit to:

receive an indication that the branch instruction is to be fetched, wherein the indication is based on an output of the branch prediction circuit;

based on the indication, perform a search of the repository to access the branch information; and based on the search, send to the branch prediction circuit a signal to clear a prediction of an instruction to be executed after the branch instruction.

2. The IC of claim 1, wherein:

the branch information comprises an identifier of another instruction as a target of the branch instruction; and based on the search, the evaluation circuit is further to output a signal to fetch the other instruction.

3. The IC of claim 1, wherein the signal is to clear one or more entries from a branch target buffer which is coupled to the branch prediction circuit.

4. The IC of claim 1, wherein, based on the search, the evaluation circuit is further to send another signal to clear one or more entries of a prediction queue which is coupled between the branch prediction circuit and the evaluation circuit.

5. The IC of claim 1, wherein, based on the event, the detector circuit is to provide to the repository respective branch information for each direct call instruction of the multiple instructions.

6. The IC of claim 5, wherein:

each direct call instruction of the multiple instructions is to correspond to a different respective return instruction of one or more return instructions; and wherein, based on the event, the detector circuit is to provide to the repository respective branch information for each of the one or more return instructions.

7. The IC of claim 1, wherein:

the instruction fetch circuit is to fetch instructions from a first cache;

the repository comprises a second cache; and the detector circuit is to cache the branch information to a line of the second cache based on the event.

8. The IC of claim 7, wherein the line of the second cache is to be indexed based on a corresponding line of the first cache.

9. The IC of claim 7, wherein:

for each branch instruction of the multiple instructions which is of a direct call instruction type or of a return instruction type, the detector circuit is to cache branch information, which corresponds to the branch instruction, to a different respective line of the second cache based on the event.

10. A system comprising:

a processor core comprising:

a detector circuit to be coupled to a decoder circuit, the detector circuit to monitor operations of the decoder circuit to detect an event wherein multiple instructions are fetched, wherein the multiple instructions comprise a branch instruction; and an instruction fetch circuit to be coupled to a branch prediction circuit, and to the decoder circuit, the instruction fetch circuit comprising:

a repository coupled to the detector circuit, wherein, based on the event, the repository is to receive from the detector circuit branch information which corresponds to the branch instruction; and an evaluation circuit coupled to the repository, the evaluation circuit to:

receive an indication that the branch instruction is to be fetched, wherein the indication is based on an output of the branch prediction circuit;

based on the indication, perform a search of the repository to access the branch information; and based on the search, send to the branch prediction circuit a signal to clear a prediction of an instruction to be executed after the branch instruction;

a memory controller coupled to the processor core; and a memory coupled to the memory controller, the memory to store information which is accessible to the processor core via the memory controller.

11. The system of claim 10, wherein:

the branch information comprises an identifier of another instruction as a target of the branch instruction; and based on the search, the evaluation circuit is further to output a signal to fetch the other instruction.

12. The system of claim 10, wherein the signal is to clear one or more entries from a branch target buffer which is coupled to the branch prediction circuit.

13. The system of claim 10, wherein, based on the event, the detector circuit is to provide to the repository respective branch information for each direct call instruction of the multiple instructions.

14. The system of claim 10, wherein:

the instruction fetch circuit is to fetch instructions from a first cache;

the repository comprises a second cache; and the detector circuit is to cache the branch information to a line of the second cache based on the event.

15. The system of claim 14, wherein the line of the second cache is to be indexed based on a corresponding line of the first cache.

16. A method at a processor, the method comprising:

monitoring operations of a decoder circuit, wherein the monitoring detects an event wherein multiple instructions are fetched, wherein the multiple instructions comprise a branch instruction;

based on the event, providing branch information to a repository of an instruction fetch circuit, wherein the branch information corresponds to the branch instruction; and with an evaluation circuit of the instruction fetch circuit:

receiving an indication that the branch instruction is to be fetched, wherein the indication is based on an output of a branch prediction circuit;

based on the indication, performing a search of the repository to access the branch information; and based on the search, sending to the branch prediction circuit a signal to clear a prediction of an instruction to be executed after the branch instruction.

17. The method of claim 16, wherein:

the branch information comprises an identifier of another instruction as a target of the branch instruction; and the method further comprises:

with the evaluation circuit, outputting a signal to fetch the other instruction based on the search.

18. The method of claim 16, wherein the signal is to clear one or more entries from a branch target buffer which is coupled to the branch prediction circuit.

19. The method of claim 16, wherein, based on the event, the repository receives respective branch information for each direct call instruction of the multiple instructions.

20. The method of claim 19, wherein:

each direct call instruction of the multiple instructions corresponds to a different respective return instruction of one or more return instructions; and wherein, based on the event, the repository receives respective branch information for each of the one or more return instructions.

\* \* \* \* \*